(12) United States Patent
Sun et al.

(10) Patent No.: US 9,079,982 B2
(45) Date of Patent: Jul. 14, 2015

(54) METHODS OF MAKING HIGH IMPACT POLYSTYRENE

(75) Inventors: Likuo Sun, Houston, TX (US); Jose M. Sosa, Deer Park, TX (US); Serge Eon, Rhode Saint Genes (BE); Carlos Corleto, Seabrook, TX (US); Scott Cooper, Humble, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 114 days.

(21) Appl. No.: 13/249,383

(22) Filed: Sep. 30, 2011

(65) Prior Publication Data

US 2012/0108747 A1 May 3, 2012

Related U.S. Application Data

(60) Provisional application No. 61/408,035, filed on Oct. 29, 2010.

(51) Int. Cl.
  *C08F 279/02* (2006.01)
  *C08F 212/08* (2006.01)
  *C08F 2/00* (2006.01)

(52) U.S. Cl.
  CPC .............. *C08F 2/001* (2013.01); *C08F 279/02* (2013.01); *C08F 212/08* (2013.01)

(58) Field of Classification Search
  CPC ....... C08F 2/001; C08F 212/08; C08F 279/02
  USPC ............. 525/53, 64, 69, 70, 86, 87, 240, 242, 525/243, 316
  See application file for complete search history.

(56) References Cited

U.S. PATENT DOCUMENTS

| | | | | |
|---|---|---|---|---|
| 4,861,827 A | * | 8/1989 | Sosa et al. | 525/54 |
| 5,861,455 A | * | 1/1999 | Reddy et al. | 524/504 |
| 6,031,050 A | | 2/2000 | Nozawa et al. | 525/242 |
| 6,162,880 A | * | 12/2000 | Sosa et al. | 526/67 |
| 6,177,512 B1 | * | 1/2001 | Gibbons et al. | 525/53 |
| 6,613,837 B2 | | 9/2003 | Reddy et al. | |
| 6,822,046 B2 | | 11/2004 | Li et al. | |
| 7,087,139 B1 | * | 8/2006 | Berti et al. | 159/2.3 |
| 2002/0032282 A1 | * | 3/2002 | Hsu | 525/191 |
| 2007/0100079 A1 | * | 5/2007 | Sosa et al. | 525/244 |
| 2007/0142549 A1 | * | 6/2007 | Berti et al. | 525/53 |
| 2010/0125122 A1 | * | 5/2010 | Bouquet et al. | 525/232 |

FOREIGN PATENT DOCUMENTS

| | | |
|---|---|---|
| EP | 0254706 A2 | 1/1988 |
| WO | 01/09210 A1 | 2/2001 |

OTHER PUBLICATIONS

Extended Search Report issued in European Application No. 11836872.9-1301 dated Mar. 14, 2014 (9 pages).
Stephane Jouenne et al., "Styrene-Butadiene Gradient Block Copolymers for Transparent Impact Polystyrene", Macromolecules 2008, vol. 41, pp. 9823-9830.

* cited by examiner

*Primary Examiner* — Roberto Rabago

(57) ABSTRACT

A process for producing high impact polystyrene including feeding at least one vinyl aromatic monomer, an elastomer, and a free radical initiator to a first linear flow reactor to form a reaction mixture. Polymerizing the reaction mixture in the first linear flow reactor to a point below the point at which phase inversion occurs to produce a first polymerization mixture and feeding the first polymerization mixture from the first linear flow reactor to a second linear flow reactor. Polymerizing the reaction mixture in the second linear flow reactor to at least a phase inversion point of the mixture to produce a second polymerization mixture and feeding the second polymerization mixture from the second linear flow reactor to at least a third linear flow reactor for post-inversion polymerization of the second polymerization mixture. The product stream can have an ESCR value of at least 10% toughness retained with less than 10 wt % rubber content.

39 Claims, 11 Drawing Sheets

Trial 52

METHODS OF MAKING HIGH IMPACT POLYSTYRENE

CROSS-REFERENCE TO RELATED APPLICATIONS

The present application claims priority to U.S. provisional patent 61/408,035 filed Oct. 29, 2010.

FIELD

The present invention generally relates to the production of polystyrene. More specifically, this invention relates to the production of high impact polystyrene using continuously stirred tank reactors or plug flow reactors or combinations thereof.

BACKGROUND

Elastomer-reinforced polymers of monovinylidene aromatic compounds such as styrene, alpha-methylstyrene and ring-substituted styrene are used extensively in wide ranging commercial applications. For example, elastomer-reinforced styrene polymers having discrete elastomer particles such as cross-linked rubber dispersed throughout the styrene polymer matrix can be useful for a wide range of applications including food packaging, office supplies, automobile component parts, houseware and consumer goods, building insulation and cosmetics packaging. Such elastomer-reinforced polymers are commonly referred to as high impact polystyrene (HIPS).

Methods for the production of polymers, such as HIPS, can employ polymerization using a continuous flow process. Continuous flow processes involve apparatuses including a plurality of successively arranged reactors wherein the degree of polymerization increases from one reactor to the next. The reactor types used in the production of HIPS can include continuously stirred tank reactors (CSTR) and/or plug flow reactors (PFR). Factors such as the arrangement of the reaction vessels and the reaction conditions influence the characteristics of the HIPS produced. The extent of polymerization within each reactor, resulting in differing mechanical and/or optical properties, as well as the amount elastomer content may determine the grade of HIPS produced.

The physical characteristics and mechanical properties of HIPS are dependent upon many factors such as the particle size of the cross-linked rubber particles. An important quality of HIPS material is the ability of such material to resist environmental stress cracking. This ability must be combined with the characteristic of high impact strength in order to be useful in articles such as food containers. In addition, other important properties for such articles include flexural strength and tensile strength.

For HIPS or any other thermoplastic polymer used in the preparation of food containers, the property of stress crack resistance, or environmental stress crack resistance (ESCR), is particularly important. The food content of such polymer containers might not normally degrade HIPS or any other type of polymeric material of which the container is made, but when a thermoplastic polymer is thermoformed from extruded sheet material, residual stresses are locked into the molded article. These stresses open the polymer up to attack by substances of which the polymer would normally be impervious to. Such articles made from styrene polymers modified with rubber to increase impact strength are prone to stress cracking when they come into contact with common agents found in organic food products such as fats and oils. Likewise, such products are also subject to stress cracking when coming into contact with organic blowing agents such as halohydrocarbons, containing fluorine and chlorine. These polymers generally are found in household items such as refrigerator liners, which may crack when the cavities in the refrigerators are filled with polyurethane foam as a result of the blowing agent utilized in the foam.

In the past, efforts to prevent or mitigate environmental stress cracking consisted of complex procedures usually involving multiple layer polymer construction wherein an intermediate protective layer of polymer is placed between a polystyrene layer and a blowing agent or a polystyrene layer and a fatty food material. One such layer of material utilized to insulate the styrene from these agents is a terpolymer material known as ABS, or acrylonitrile-butadiene-styrene. Other attempts to improve the stress crack resistance of high impact monovinylaromatic polymers include increasing the amount of rubber mixed in the polymer. The higher rubber content, however, can decrease the tensile and flexural strengths, and will typically increase the cost.

The type of continuous flow processes used, as well as the amount of elastomer utilized, greatly influences the cost of HIPS production. Thus it would be desirable to develop an apparatus and methodology for the production of HIPS having reduced elastomer content with enhanced mechanical properties, such as impact strength, ductility, and ESCR. It would also be desirable to develop an apparatus and methodology for the production of HIPS having improved environmental stress crack resistance.

SUMMARY

The present invention in its many embodiments relates to a process of making high impact polystyrene. An embodiment of the present invention, either by itself or in combination with any other embodiment, is a process for producing high impact polystyrene including feeding at least one vinyl aromatic monomer, an elastomer, and a free radical initiator to a first linear flow reactor to form a reaction mixture. The reaction mixture in the first linear flow reactor is polymerized to a point below the point at which phase inversion occurs to produce a first polymerization mixture. The first polymerization mixture from the first linear flow reactor is fed to a second linear flow reactor where the first polymerization mixture is further polymerized to at least the phase inversion point of the mixture to produce a second polymerization mixture. The second polymerization mixture from the second linear flow reactor is then fed to a third linear flow reactor, and optionally more reactors, for post-inversion polymerization of the second polymerization mixture.

An embodiment of the present invention, either by itself or in combination with any other embodiment, is a process for producing high impact polystyrene that includes feeding at least one vinyl aromatic monomer, an elastomer, and a free radical initiator to a mixing tank to form a reaction mixture prior to feeding the reaction mixture from the mixing tank to a first linear flow reactor and proceeding as in the process described above.

An alternate embodiment of the present invention, either by itself or in combination with any other embodiment, includes feeding at least one vinyl aromatic monomer, an elastomer, and a free radical initiator to a heated mixing tank to form a reaction mixture; and heating the reaction mixture in the heated mixing tank prior to feeding the reaction mixture from the mixing tank to a first linear flow reactor and proceeding as in the process described above.

An embodiment of the present invention, either by itself or in combination with any other embodiment, is a process for producing high impact polystyrene that includes feeding at least one vinyl aromatic monomer, an elastomer, and a free radical initiator to a CSTR to form a reaction mixture; polymerizing the reaction mixture in the CSTR to a point below the point at which phase inversion occurs to produce a first polymerization mixture; feeding the first polymerization mixture from the CSTR to a first linear flow reactor; polymerizing the first polymerization mixture in the first linear flow reactor to at least a phase inversion point to produce a second polymerization mixture; and feeding the second polymerization mixture from the first linear flow reactor to at least a second linear flow reactor for post-inversion polymerization of the second polymerization mixture.

Further disclosed herein is a continuous process for producing high impact polystyrene by feeding at least one vinyl aromatic monomer, an elastomer, polyisobutylene, and a free radical initiator to a series of polymerization reactors. The series of polymerization reactors may include at least two linear flow reactors. After the polymerization the product can be devolatized using a preheater that operates at a reduced temperature. The preheater can operate at a temperature of less than 470° F. (243° C.) to give enhanced ESCR values.

Embodiments of the invention can produce a product with an ESCR value of at least 10% toughness retained with less than 10% rubber content. Embodiments of the invention can produce a product with a rubber particle size (RPS) between 5 μm and 8 μm.

The various embodiments of the present invention can be joined in combination with other embodiments of the invention and the listed embodiments herein are not meant to limit the invention. All combinations of embodiments of the invention are enabled, even if not given in a particular example herein.

DETAILED DESCRIPTION

Figure 1:
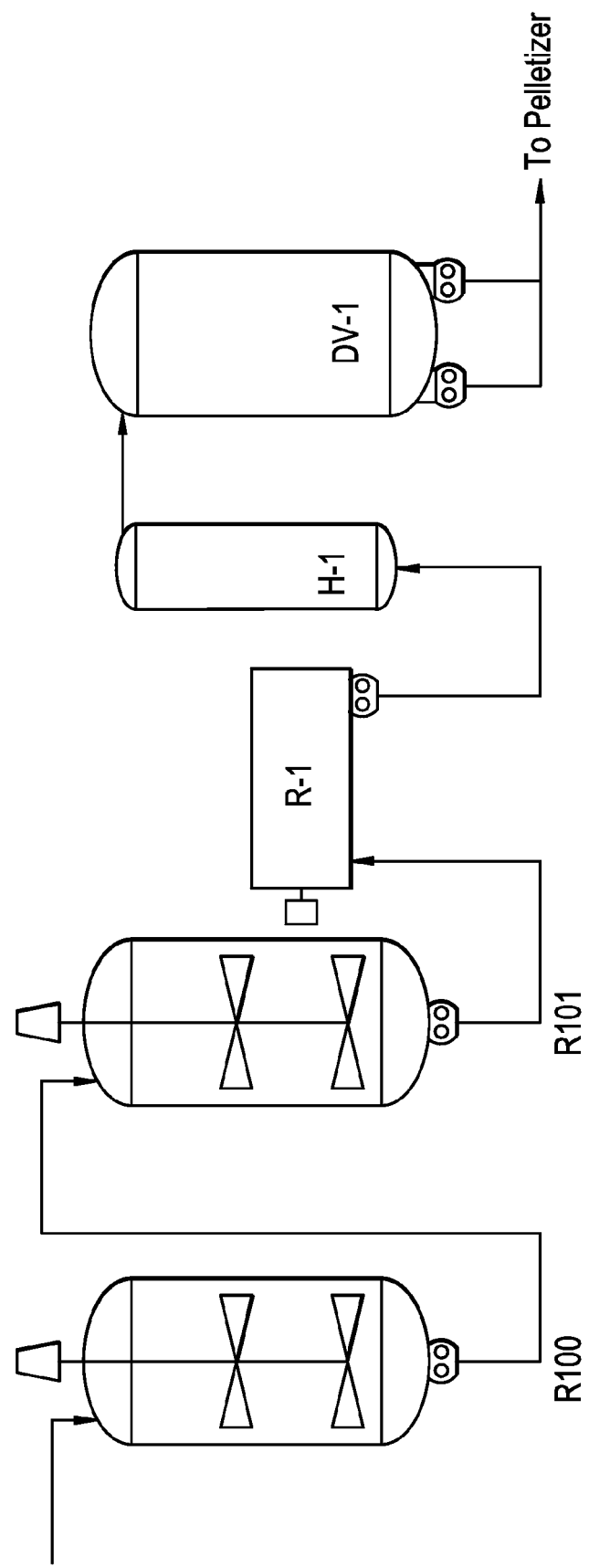
FIG. 1 is a schematic of a prior art HIPS production process.

FIG. 1 illustrates a prior art high impact polystyrene (HIPS) production process of U.S. Pat. No. 4,777,210 which is incorporated by reference in its entirety. This process includes a continuously stirred tank reactor (CSTR) pre-inversion reactor R100 followed by a CSTR inversion reactor R101 followed by at least one plug flow post inversion reactor R-1. The output of R-1 is sent to a conventional heater H-1 followed by a conventional devolatizer DV-1.

Figure 2:
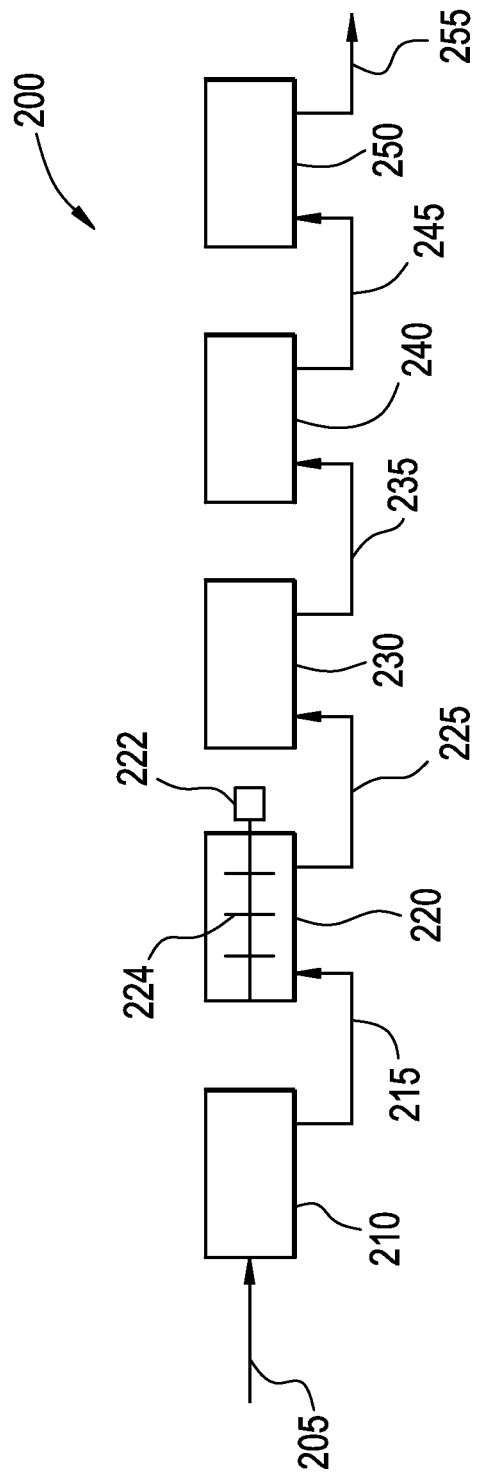
FIG. 2 is a schematic of an embodiment of the HPFIR process of the present invention.

FIG. 2 depicts a schematic of a reactor system 200 for the continuous production of an elastomer-reinforced polymer. In an embodiment, the reactor system 200 is useful for a continuous HIPS production process. Referring to FIG. 2, a reaction mixture comprising styrene, an elastomer such as polybutadiene rubber, and a free radical initiator may be fed to a first linear flow reactor 210, through a feed line or lines generally indicated as 205. In an alternative embodiment the reaction mixture comprises styrene, an elastomer such as polybutadiene rubber, a chain transfer agent and additional components such as those known in the art for the production of HIPS. In another embodiment, the reaction mixture comprises styrene, an elastomer such as polybutadiene rubber, a combination of a free radical initiator and a chain transfer agent and additional components such as those known in the art for the production of HIPS. The selection and amount of free radical initiator, chain transfer agent and additional components for the production of HIPS may be included as known to one having ordinary skill in the art.

In an embodiment a reaction mixture that is fed to the continuous HIPS production process may include about 75% to about 99% styrene, from about 1% to about 15% polybutadiene, from about 0.001% to about 0.2% free radical initiator as well as additional components as needed to impart any desired physical properties. The present values are percentages by weight of the total composition.

The term linear flow reactor includes plug-flow reactors (PFR). The first linear flow reactor, or PFR, 210 may be operated under conditions that allow the polymerization reaction to proceed to any point before phase inversion occurs. In an embodiment, the first linear flow reactor 210 is operated under pre-inversion conditions, i.e. the continuous phase therein is a styrene-rubber solution and the discontinuous phase is styrene-polystyrene. In an embodiment, the styrene diluents can include further diluents such as ethylbenzene, toluene, xylene, and combinations thereof. In an embodiment, the first linear flow reactor 210, or pre-inversion reactor (PIR), is located directly before a polymerization reactor such that the styrene polybutadiene, free radical initiator and other components are fed to the PIR 210 and the mixture exiting the PIR is subsequently fed to the polymerization reactor 220.

In an embodiment the polymerization reactor 220 is a second linear-flow reactor. In an embodiment the linear flow reactors include plug flow reactors (PFR). In an embodiment the polymerization reactor 220, or second PFR, is arranged vertically. In another embodiment the second PFR 220 is arranged horizontally.

In an embodiment, the polymerization reactor 220, or second linear flow reactor, may be operated under conditions that allow the polymerization reaction to proceed to at least a point of phase inversion before the reaction mixture is introduced to any additional polymerization reactors. As such polymerization reactor 220 is termed a plug flow inversion reactor (PFIR). Stated alternatively, the reactants in the polymerization reactor 220 undergo phase inversion prior to exiting the reactor, referred to here as PFIR 220.

Phase inversion refers to a morphological transformation that occurs during the preparation of HIPS. The feedstock for HIPS preparation generally includes polybutadiene rubber and styrene monomer. These two components are generally miscible. At the pre-inversion stage of production, a mixture of styrene and polybutadiene forms the continuous phase with a mixture of polystyrene and styrene dispersed therein. As the reaction of styrene into polystyrene progresses and the amount of polystyrene increases, phase inversion occurs, after which the polystyrene/styrene mixture forms the continuous phase with rubber particles dispersed therein. This phase inversion leads to the formation of complex rubber particles in which the rubber exists in the form of membranes surrounding occluded domains of polystyrene. The size and distribution of the rubber particles can influence the physical and mechanical properties of HIPS.

In an embodiment, the polymerization reactor 220 may be operated under conditions that allow the polymerization reaction to proceed to any point before phase inversion occurs. In an embodiment, the polymerization reactor 220 is operated under pre-inversion conditions, i.e. the continuous phase therein is a styrene-rubber solution and the discontinuous phase is styrene-polystyrene. In another embodiment the first linear flow reactor 210 and the polymerization reactor 220 are each operated under pre-inversion conditions. In a further embodiment the first linear flow reactor 210, the polymerization reactor 220 and any immediately successive PFRs are each operated under pre-inversion conditions. In an aspect, the first linear flow reactor 210 as well as any other reactor preceding the PFIR are each operated under pre-inversion conditions.

The PFIR may be operated under various temperature ranges. In an embodiment, the PFIR is operated at temperatures of 230° F. (110° C.) or greater. In another embodiment, the PFIR is operated at temperatures of from 230° F. to 300° F. (110° C.-149° C.). In a more specific embodiment, the PFIR is operated at temperatures of from 240° F. to 280° F. (115° C.-138° C.). In a further embodiment, the PFIR is operated at temperatures of from 260° F. to 270° F. (127° C.-132° C.).

Plug flow characteristics can be useful in an inversion reactor to optimize the formation of rubber particles. Referring again to FIG. 2, the PFIR 220 may contain agitators 224 driven by a motor 222. Such agitators may promote radial dispersion of the reactants but are not intended to provide axial mixing so as to minimize back-mixing in the reactor. In one embodiment, an agitator blade configuration in a linear flow reactor can be adjusted to improve plug flow characteristics.

In an embodiment, the agitators of the plug flow reactors are operated to give shear rate of less than 175 $s^{-1}$. In an embodiment, the agitators of the plug flow reactors are operated at shear rate of from 8 $s^{-1}$ to 150 $s^{-1}$. In another embodiment, the agitators of the plug flow reactors are operated at shear rate of from 8 $s^{-1}$ to 90 $s^{-1}$. In an embodiment, the agitators of the plug flow reactors are operated at shear rate of from 25 $s^{-1}$ to 75 $s^{-1}$. In a further embodiment, the agitators of the plug flow reactors are operated at shear rate of from 8 $s^{-1}$ to 50 $s^{-1}$. In an aspect the agitators of the plug flow inversion reactor, PFIR, are operated at shear rate of less than 175 $s^{-1}$. In another aspect the agitators of the PFIR are operated at shear rate of from 35 to 90 $s^{-1}$. In an alternative aspect the agitators of the PFIR are operated at shear rate of from 50 to 70 $s^{-1}$. The ability to vary the shear rate at the point of inversion within the system can lead to improved morphology of the product. The reactor size, production rate, agitator speed, and agitator configuration are factors that can be altered to control the shear rate at the point of inversion within the system and lead to improved morphology of the product.

Referring again to FIG. 2, a reactor process 200 is shown where the output line 215 from the linear flow pre-inversion reactor, PIR, 210 may be directed to the polymerization reactor 220. Output from reactor 220 may be directed to the second polymerization reactor 230 via line 225. Output from reactor 230 may be directed to the third polymerization reactor 240 via line 235. Output from reactor 240 may be directed to the fourth polymerization reactor 250 via line 245. In an embodiment, each of the polymerization reactors are linear-flow reactors. In another embodiment, the first polymerization reactor 220 is an inversion reactor. In a further embodiment, the second polymerization reactor 230 is an inversion reactor. The polymerization of styrene to polystyrene may continue with the output from polymerization reactor 220 being fed to additional polymerization reactors 230, 240 and 250, via lines 225, 235 and 245, respectively. In an embodiment, reactors 230, 240 and 250 may be linear-flow reactors, such as plug-flow reactors, that may also be equipped with agitators driven by motors. In the embodiment shown in FIG. 2, the three linear flow reactors 230, 240 and 250 are horizontally oriented and serially connected to polymerization reactor 220 as desired by the user. The number, orientation (e.g., horizontal or vertical), and connectivity (e.g., serial or parallel) of the linear flow reactors may be determined by one skilled in the art based on requirements such as production capacity required or extent of product conversion desired. The resultant HIPS polymer and any other remaining compounds may be removed from the final reactor, e.g., reactor 250, via line 255, and thereafter the HIPS polymer may be recovered and optionally further processed, such as pelletized.

In an embodiment, the linear-flow reactors include at least 2 serially arranged reactors situated immediately after the pre-inversion reactor. In another embodiment, 2 to 10 serially arranged reactors are situated immediately after the pre-inversion reactor. In a further embodiment, 4 serially arranged reactors are situated immediately after the pre-inversion reactor. The linear-flow reactors may be arranged in series or in parallel. In an embodiment, at least 2 of the linear-flow reactors are arranged in a parallel manner. In an alternate embodiment, referring to FIG. 2, one or more of the reactors 210, 220, 230, 240, 250 represent more than one reactor that is parallel. For example reactor 230 can represent two reactors in parallel and reactor 240 can represent three reactors in parallel.

Figure 3:
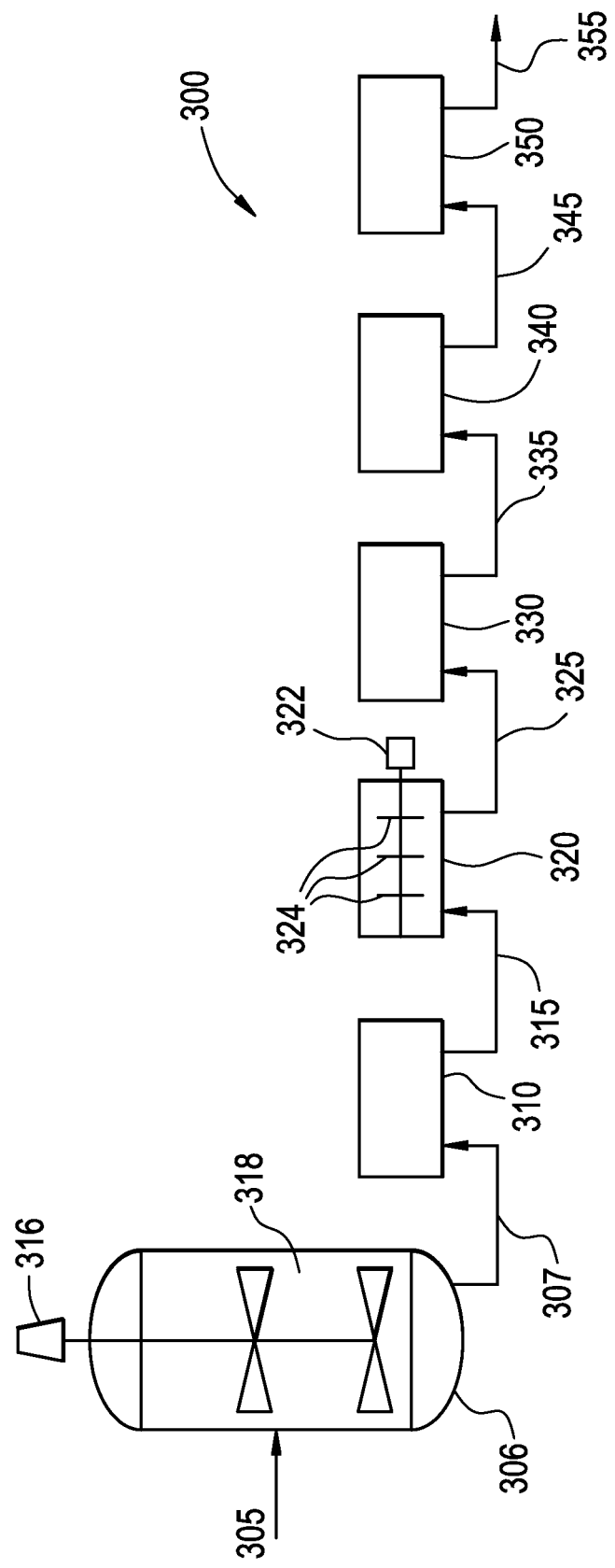
FIG. 3 is a schematic of an embodiment of the HPFIR process of the present invention containing a mixing tank.

FIG. 3 depicts a schematic of a reactor system 300 for the continuous production of an elastomer-reinforced polymer, wherein the reactor scheme of FIG. 2 is preceded by a mixing tank 306. In an embodiment, the reactor system 300 is useful for a continuous HIPS production process. Referring to FIG. 3, a reaction mixture comprising styrene, an elastomer such as polybutadiene rubber, and a free radical initiator may be fed to a mixing tank 306, through a feed line or lines generally indicated at 305 and may contain agitators 318 driven by a motor 316.

In an embodiment, the mixing tank 306 precedes the linear flow reactor system of FIG. 2. In FIG. 3, the output line 307 from the mixing tank enters the linear flow pre-inversion reactor, PIR 310. Output from PIR 310 may be directed via line 315 to a polymerization reactor 320, the inversion reactor, that may contain agitators 324 driven by a motor 322. Output from reactor 320 may be directed to a second polymerization reactor 330 via line 325. Output from reactor 330 may be directed to a third polymerization reactor 340 via line 335. Output from reactor 340 may be directed to a fourth polymerization reactor 350 via line 345. Output from reactor 350 may exit the process via line 355. In an embodiment, each of the polymerization reactors are linear-flow reactors. In another embodiment, the first polymerization reactor 320 is an inversion reactor. In a further embodiment, the second polymerization reactor 330 is an inversion reactor. The polymerization of styrene to polystyrene may continue with the output from polymerization reactor 320 being fed to additional polymerization reactors 330, 340 and 350, via lines 325, 335 and 345, respectively. In an embodiment, reactors 330, 340 and 350 may be linear-flow reactors, such as plug-flow reactors, that may also be equipped with agitators driven by motors. In the embodiment shown in FIG. 3, the three linear flow reactors 330, 340 and 350 are horizontally oriented and serially connected to polymerization reactor 320. The number, orientation (e.g., horizontal or vertical), and connectivity (e.g., serial or parallel) of the linear flow reactors may be determined by one skilled in the art base on requirements such as production capacity required or extent of product conversion desired. The resultant HIPS polymer and any other remaining compounds may be removed from the final reactor, e.g., reactor 350, via line 355, and thereafter the HIPS polymer may be recovered and optionally further processed, such as pelletized.

In an embodiment, the mixing tank 306 is a stirred tank reactor, such as a CSTR. In an embodiment, the interior volume of the mixing tank has a ratio to the linear flow reactors of from 1:4 to 8:1. In an alternative embodiment the volume of the mixing tank has a ratio to the linear flow reactors of from 1:2 to 4:1. In a further embodiment the volume of the mixing tank has a ratio to the linear flow reactors from 1:2 to 2:1. In an embodiment the liquid level percent of the mixing tank is at 100% of the tank volume. In another embodiment the liquid level percent of the mixing tank is from 5 to 99.9%. In an alternative embodiment the liquid level of the mixing tank is from 10 to 95%. In a further embodiment the liquid level of the mixing tank is from 25 to 90%. In another specific embodiment in which the mixing tank is a CSTR, the liquid level is at the lowest level sufficient to completely submerge the agitators of the CSTR.

In an embodiment the mixing tank 306 is not subjected to heat from an outside source. In such an embodiment the only heat supplied to the mixing tank is from the feed streams. In another embodiment, heat is applied to the mixing tank via an outside source. In an aspect the outside heating source includes a steam jacket and any other known apparatus for heating a mixing tank. In an embodiment, a mixture inside the mixing tank is heated to temperatures of less than 230° F. (110° C.). In another embodiment the mixture is heated to temperatures of from 150° F. to 225° F. (65° C.-107° C.). In a further embodiment the mixture is heated to temperatures of from 175° F. to 220° F. (79° C.-104° C.).

Figure 4:
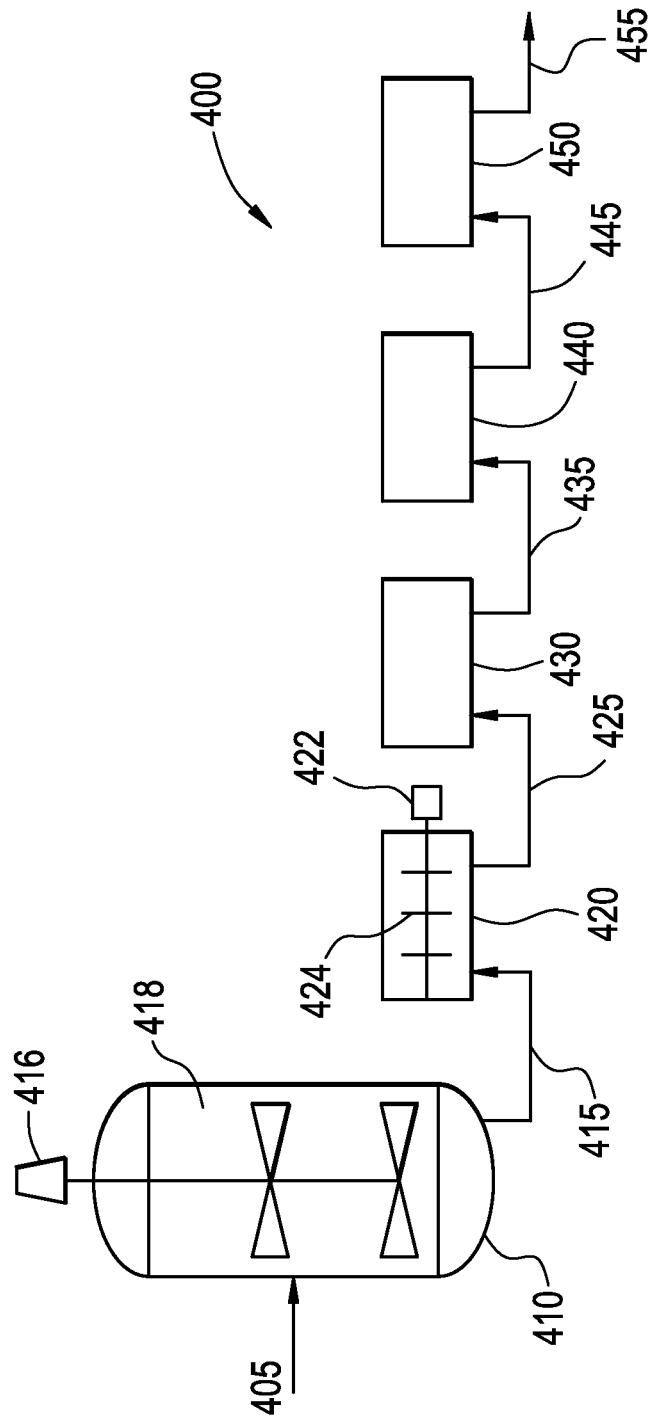
FIG. 4 is a schematic of an embodiment of the HPFIR process of the present invention having a CSTR followed by the PFIR.

FIG. 4 depicts a schematic of a reactor system 400 for the continuous production of an elastomer-reinforced polymer, wherein the PIR reactor in the reactor scheme of FIG. 2 is a CSTR. In an embodiment, reactor system 400 is useful for a continuous HIPS production process. Referring to FIG. 4, a reaction mixture comprising styrene, an elastomer such as polybutadiene rubber, and a free radical initiator may be fed to a CSTR 410, through a feed line or lines generally indicated at 405. In an alternative embodiment the reaction mixture comprises styrene, an elastomer such as polybutadiene rubber, a chain transfer agent and additional components such as those known in the art for the production of HIPS. In another embodiment, the reaction mixture comprises styrene, an elastomer such as polybutadiene rubber, a combination of a free radical initiator and a chain transfer agent and additional components such as those known in the art for the production of HIPS. The selection and amount of free radical initiator, chain transfer agent and additional components for the production of HIPS may be included as known to one having ordinary skill in the art. The feed line 405 may be configured for the introduction of the reaction mixture through the side of the reactor, as shown in FIG. 4, alternatively such a feed line may be configured for introduction of the reaction mixture through the top of the reactor, alternatively the feed line may be configured for introduction of the reaction mixture through any position along the reactor vessel that is compatible with the reaction mixture and the reactor equipment.

In an embodiment a reaction mixture that is fed to the CSTR may include about 75% to about 99% styrene, from about 1% to about 15% polybutadiene, from about 0.001% to about 0.2% free radical initiator as well as additional components as needed to impart any desired physical properties. The present values are percentages by weight of the total composition.

The CSTR 410 contains an agitator 418 driven by a motor 416. The CSTR may be of any size that is compatible with the scale of the process. The level of the contents of the CSTR can be well controlled, rendering minimal fluctuation in level, resulting in a very tight control of the temperature and other conditions of the CSTR. In an embodiment the liquid level of the CSTR is from 20 to 100%. In a further embodiment the liquid level of the CSTR is from 40 to 90%.

The CSTR 410 may be operated under conditions that allow the polymerization reaction to proceed to any point before phase inversion occurs. In an embodiment, the CSTR 410 is operated under pre-inversion conditions, i.e. the continuous phase therein is a styrene-rubber solution and the discontinuous phase is styrene-polystyrene. In an embodiment, the CSTR 410, or pre-inversion reactor, is located directly before a polymerization reactor such that the styrene polybutadiene, free radical initiator and other components are fed to the pre-inversion reactor 410 and the mixture exiting the pre-inversion reactor is subsequently fed to the polymerization reactor 420. In an embodiment, the CSTR is operated at temperatures of less than 260° F. (127° C.). In another embodiment the CSTR is operated at temperatures of from 220° F. to 260° F. (104° C.-127° C.).

In an embodiment the polymerization reactor 420 is a linear-flow reactor, such as a PFR. In an embodiment the polymerization reactor 420, or PFR, is arranged vertically. In another embodiment the PFR 420 is arranged horizontally.

In an embodiment, the polymerization reactor 420 may be operated under conditions that allow the polymerization reaction to proceed to at least a point of phase inversion before the reaction mixture is introduced to any additional polymerization reactors. As such the polymerization reactor 420 is termed a plug flow inversion reactor (PFIR). Stated alternatively, the reactants in the polymerization reactor 420 undergo phase inversion prior to exiting the reactor, referred to here as PFIR 420.

In an embodiment, the polymerization reactor 420 may be operated under conditions that allow the polymerization reaction to proceed to any point before phase inversion occurs. In an embodiment, the polymerization reactor 420 is operated under pre-inversion conditions, i.e. the continuous phase therein is a styrene-rubber solution and the discontinuous phase is styrene-polystyrene. In another embodiment the CSTR 410 and the polymerization reactor 420 are each operated under pre-inversion conditions. In a further embodiment the CSTR 410, the polymerization reactor 420 and any immediately successive PFRs are each operated under pre-inversion conditions. In an aspect, the CSTR 410 as well as any other reactor preceding the PFIR are each operated under pre-inversion conditions.

Referring again to FIG. 4, the output line 415 from CSTR 410 may be directed to the first polymerization reactor, PFIR 420. The PFIR 420 may contain agitators 424 driven by a motor 422. Output from reactor 420 may be directed to the second polymerization reactor 430 via line 425. Output from reactor 430 may be directed to the third polymerization reactor 440 via line 435. Output from reactor 440 may be directed to the fourth polymerization reactor 450 via line 445. In an embodiment, each of the polymerization reactors are linear-flow reactors. In another embodiment, the first polymerization reactor 420 is an inversion reactor. In a further embodiment, the second polymerization reactor 430 is an inversion reactor. The polymerization of styrene to polystyrene may continue with the output from polymerization reactor 420 being fed to additional polymerization reactors 430, 440 and 450, in a serial manner, via lines 425, 435 and 445, respectively. In an embodiment, reactors 430, 440 and 450 may be linear-flow reactors, such as plug-flow reactors, that may also be equipped with agitators driven by motors. In the embodiment shown in FIG. 4, the three linear flow reactors 430, 440 and 450 are horizontally oriented and serially connected to polymerization reactor 420. The number, orientation (e.g., horizontal or vertical), and connectivity (e.g., serial or parallel) of the linear flow reactors may be determined by one skilled in the art based on requirements such as production capacity required or extent of product conversion desired. The resultant HIPS polymer and any other remaining compounds may be removed from the final reactor, e.g., reactor 450, via line 455, and thereafter the HIPS polymer may be recovered and optionally further processed, such as pelletized.

In an embodiment, the linear-flow reactors include at least two serially arranged reactors situated immediately after the CSTR pre-inversion reactor. In another embodiment, 2 to 10 serially arranged reactors are situated immediately after the CSTR pre-inversion reactor. In a further embodiment, four serially arranged reactors are situated immediately after the CSTR pre-inversion reactor. The linear-flow reactors may be arranged in series or in parallel. In an embodiment, at least two of the linear-flow reactors are arranged in a parallel manner.

In an embodiment, the product stream leaving the final polymerization reactor is sent to a devolatizer to remove volatile components from the molten polymer product prior to an extrusion step. The devolatizer can include a preheater. The devolatizer and/or preheater can be chosen from any suitable devolatizer design and devolatizer preheater design, such as for example shell-and-tube devolatizers and plate devolatizers. In an embodiment the devolatizer operates at temperatures of from 390° F. to 470° F. (199° C.-243° C.). In a further embodiment the devolatizer operates at temperatures of from 400° F. to 450° F. (204° C.-232° C.). It has been found that the lower temperature of the devolatizer can result in improved morphology of the product.

In an embodiment, ESCR-enhancing additives may be added to the initial monomer/rubber feed stream or at any point in the polymerization process up to and including the final polymerization reactor. Additives that may be added include polyisobutylene (PIB) and mineral oil. A synergistic additive combination, which can provide increases in ESCR properties, includes PIB and mineral oil. In an embodiment the additive combination includes PIB with viscosity in the range of 196-233 cst at 99° C., and mineral oil. These additives may be utilized in varying proportions. In an embodiment, mineral oil is present in the amount of from 0.5% to 3.0 wt % and PIB is present in an amount of from 0.5 wt % to 3.0 wt % in the final product. In a further embodiment mineral oil is present in the amount of from 1.0 wt % to 2.0 wt % and PIB is present in the amount of from 1.0 wt % to 2.0 wt % in the final product. The PIB may be added at any point in the process. In an embodiment, the PIB is added to the feed mixture. In another embodiment, the PIB is added prior to the PFIR. In an alternative embodiment the PIB is added to the process in a step after the PFIR. The use of PIB with mineral oil is disclosed in U.S. Pat. Nos. 5,861,455, 6,613,837, and 6,822,046, each incorporated by reference in their entirety herein.

In an aspect, the present invention also includes a method for controlling the rubber particle size (RPS) and the rubber particle size distribution (RPSD) in the HIPS product. The rubber particle size (RPS) and the rubber particle size distribution (RPSD) are key factors that can determine whether desirable morphology and physical properties are obtained. Desirable morphologies have been found to be a function of particle size. When the rubber particles become too large they can become susceptible to the shear forces from the agitators and from any shear forces present in the pelletizing process resulting in poor morphology. Poor morphology is detrimental to the environmental stress crack resistance (ESCR) property. It has been observed that the morphology may degrade when the RPS is greater than about 7.5 µm. Uniformity in the RPSD may result in improved morphology.

There is also a relationship between RPS and the percent toughness of the HIPS product. A larger RPS increases the amount of toughness of the HIPS product, thereby creating a compromise between toughness and particle integrity. To obtain high toughness values, it is desirable to have a large RPS, of about 7 µm, having desirable morphology.

In an embodiment, the present invention overcomes these obstacles by producing RPS near 7 µm, but less than 7.5 µm. In an embodiment, the method is controlled to produce RPS of from 5.0 µm to 8.0 µm. In a more specific embodiment, the method is controlled to produce RPS from 6.0 µm to 8.0 µm. In a further embodiment, the method is controlled to produce RPS from 6.8 µm to 7.5 µm. In an alternative embodiment, the method is controlled to produce a RPS from 7.0 µm to 8.0 µm.

Embodiments of the invention can produce a product with an ESCR value of at least 10% toughness retained, optionally at least 15% toughness retained, optionally at least 20% toughness retained, optionally at least 25% toughness retained. Embodiments of the invention can produce a product with an ESCR value of at least 10% toughness retained with less than 10% rubber content. Embodiments of the invention can produce a product with an ESCR value of at least 15% toughness retained with less than 10% rubber content. Embodiments of the invention can produce a product with an ESCR value of at least 20% toughness retained with less than 10% rubber content. Embodiments of the invention can produce a product with an ESCR value of at least 25% toughness retained with less than 10% rubber content.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Figure 5:
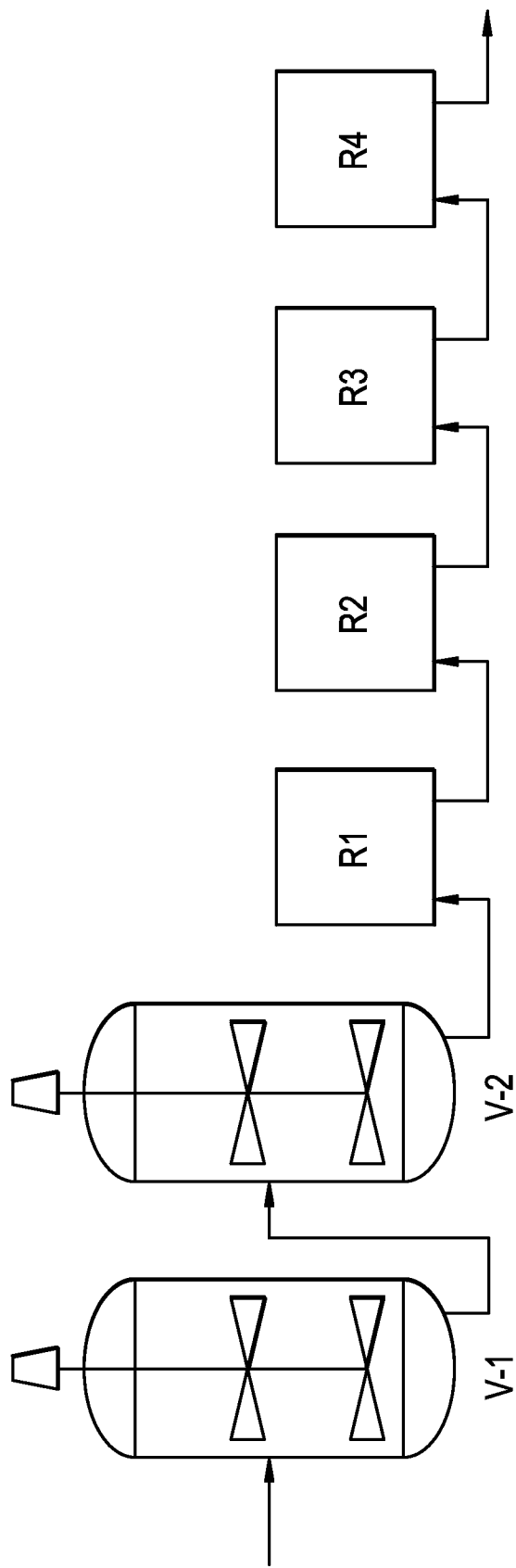
FIG. 5 is a schematic of a prior process used in Example 1.
Figure 6:
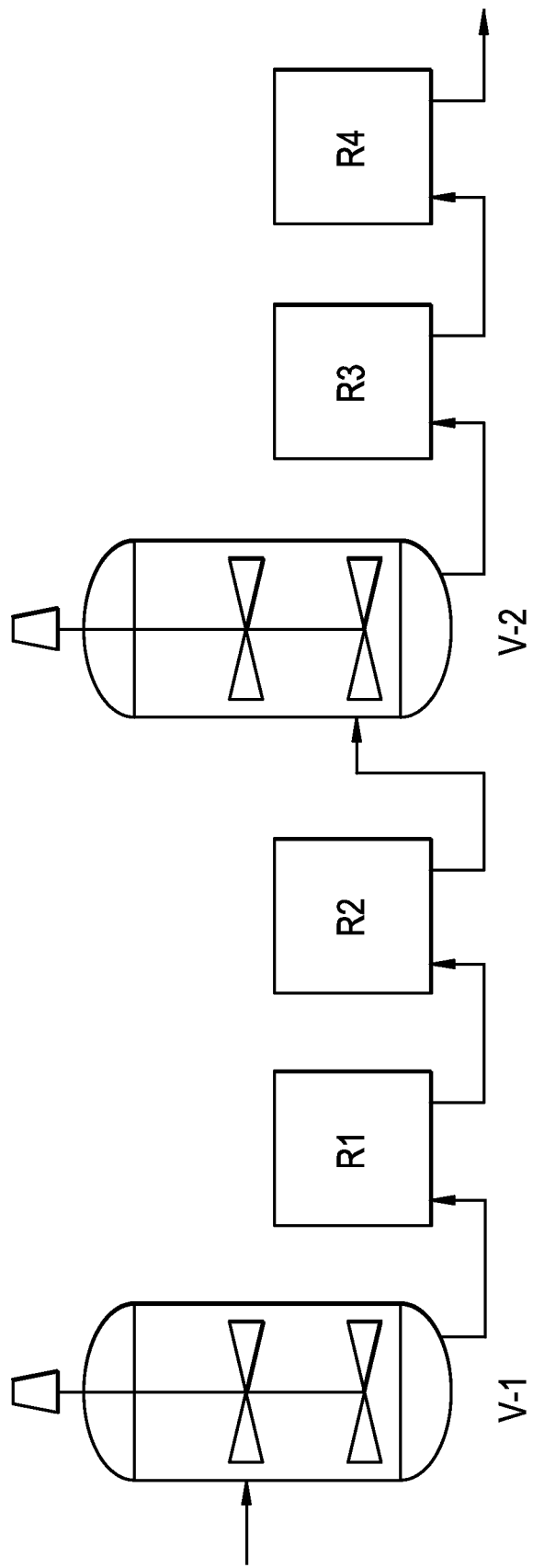
FIG. 6 is a schematic of a process used in the first test of Example 2.

In an embodiment the vessel V-1, as shown in FIGS. 5 and 6, is a stirred vessel, such as a CSTR. In an embodiment, the interior volume of V-1 has a ratio to the linear flow reactors of from 1:4 to 2:1. In an alternative embodiment the volume of the mixing tank has a ratio to the linear flow reactors of from 1:2 to 2:1. In a further embodiment the volume of the mixing tank has a ratio to the linear flow reactors of from 1:1 to 2:1.

Figure 7:
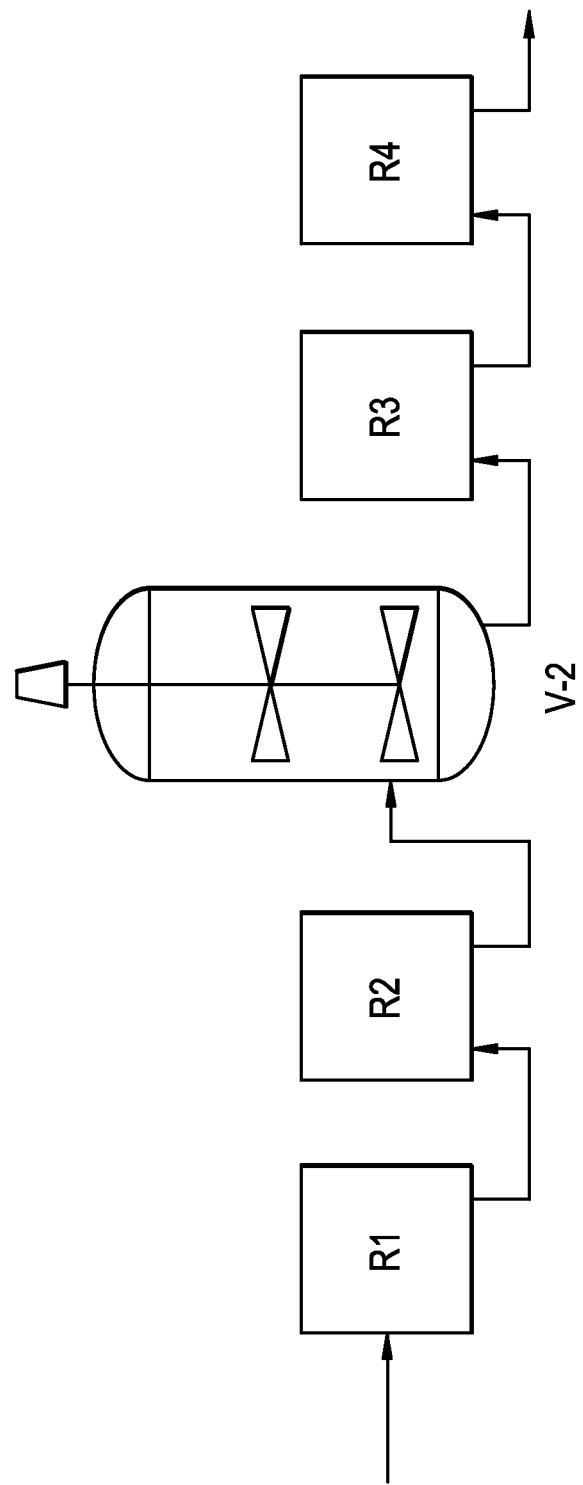
FIG. 7 is a schematic of a process used in the second test of Example 2.

In an embodiment the vessel V-2, as shown in FIGS. 5, 6, and 7, is a stirred vessel, such as a CSTR. In an embodiment, the interior volume of V-2 has a ratio to the linear flow reactors of from 1:1 to 8:1. In an alternative embodiment the volume of the mixing tank has a ratio to the linear flow reactors of from 2:1 to 6:1. In a further embodiment the volume of the mixing tank has a ratio to the linear flow reactors of from 3:1 to 5:1.

Example 1

High impact polystyrene was produced using a first horizontal plug flow inversion reactor (HPFIR) process. As depicted in FIG. 5, a baseline process starts with two CSTRs (V-1, V-2) and then followed with three or four HPFIRs (R1-R4). The rubber used was Firestone Diene 55 (D55) and Tactene by Lanxess Corp (1202) both of Orange, Tex.

Table 1 contains results of a series of trials using Lacqrene 7240, a commercial HIPS polystyrene grade available from Total Petrochemicals Europe, in the baseline process configuration as depicted in FIG. 5:

Four trials were conducted using the 7240 grade. Trial 8 used the process of the configuration, as shown in FIG. 6. Trial 9 was the same as 8, but with V-1 removed such that the feed was sent to R-1, as shown in FIG. 7. Trial 10 was the same as 9, but an initiator was added, TBIC M75 peroxide. Trial 11 was the same as 10, but with the addition of NDM.

Table 2 shows the key process conditions and resulting properties. Among the four trials, Trial 10 exhibits the best Gel:Rubber ratio, and flexibility (low modulus and high elongation at break).

TABLE 2

| Trial No. | 8 | 9 | 10 | 11 |
|---|---|---|---|---|
| Description | thermal 7240, V-1 in service | thermal 7240, V-1 bypassed | 7240/TBIC, V-1 bypassed | 7240/TBIC + NDM, V-1 bypassed |
| V-1 in Service? | Yes | No | No | No |

TABLE 1

| Trial Number | 1 | 2 | 3 | 4 | 5 | 6 | 7 |
|---|---|---|---|---|---|---|---|
| Sample Description | 50% D55 50% 1202 | 75% D55 25% 1202, | 100% D55 | 100% D55 Baseline | Feed & Recycle Top of V-2 | Reduced V-2 Agitation, 141 S$^{-1}$ | Reduced R1-R4 agitation |
| Rubber Type (Conc. 9%) | 50% D55 50% 1202 | 75% D55 25% 1202 | 100% D55 | 100% D55 | 100% D55 | 100% D55 | 100% D55 |
| Catalyst type/ppm | TBIC 360 | TBIC 360 | TBIC 360 | TBIC 360 | TBIC 360 | TBIC 360 | TBIC 360 |
| V2 Diluents, % | 6.3 | 6.9 | 6.5 | 6.7 | 6.6 | 6.6 | 6 |
| NDM, ppm | 120 | 120 | 120 | 72 | 72 | 72 | 96 |
| V1 Solids, % | 16 | 16.8 | 16.4 | 16.7 | 15.3 | 16.4 | 16.3 |
| V2 Solids, % | 36.6 | 31 | 37.5 | 32.1 | 29.5 | 28.6 | 28.4 |
| R1 Solids, % | 52.9 | 51 | 50.7 | 44.4 | 49 | 52.6 | 50.9 |
| R2 Solids, % | 66.5 | 63.8 | 65.1 | 66.2 | 60 | 66.3 | 63.2 |
| R3 Solids, % | 72.5 | 68.8 | 73.8 | 69.4 | 70 | 72 | 72.4 |
| R4 Solids, % | 75.5 | 70 | 79.2 | 75.3 | 75 | 78.5 | 78.2 |
| Production Rate, lb/hr | 91 | 91 | 91.5 | 91 | 91 | 91 | 93 |
| Gardner Impact | 82.8 | 100.5 | 116.8 | 125.6 | 133.6 | 119.6 | 136.7 |
| Izod Impact-Notched | 3.47 | 3.35 | 3.17 | 3.02 | 2.9 | 3.04 | 3.19 |
| Melt Flow Rate | 3.97 | 4.15 | 4.01 | 4.43 | 4.38 | 4.37 | 3.88 |
| Rubber Particle Size | 5.22 | 4.41 | 4.51 | 3.62 | 3.65 | 3.84 | 3.83 |
| Tensile Modulus | 235100 | 232700 | 235900 | 266600 | 257100 | 240000 | 245100 |
| Tensile Strength @ Yield | 3146 | 3254 | 3242 | 3177 | 3017 | 3368 | 3328 |
| Tensile Strength @ Break | 3049 | 3011 | 3122 | 2989 | 2937 | 3190 | 3059 |
| Elongation @ Break | 52.5 | 50.8 | 50.1 | 57.3 | 56.5 | 50.9 | 49.4 |
| Flexural Modulus | 354600 | 353900 | 346000 | 288700 | 277900 | 347700 | 344200 |
| Flexural Strength | 6987 | 7146 | 7191 | 5884 | 5752 | 7409 | 7349 |
| Swell Index | 14 | 13 | 13 | 13 | 12 | 13 | 13 |
| Gel Content | 20.11 | 21.39 | 21.75 | 23.45 | 24.23 | 23.51 | 23.78 |
| Grafting | 130.4 | 143.6 | 151.4 | 167.4 | 171 | 167.2 | 171.5 |
| Gel: Rubber | 2.30 | 2.44 | 2.51 | 2.67 | 2.71 | 2.67 | 2.71 |
| Mn | 81837 | 82096 | 77559 | 75205 | 72569 | 76731 | 76165 |
| Mw | 196983 | 196432 | 188307 | 178653 | 173682 | 182794 | 183167 |
| Polydispersity | 2.4 | 2.4 | 2.4 | 2.4 | 2.4 | 2.4 | 2.4 |
| Gloss, 20° | 7.7 | 10.8 | 12.5 | 17.8 | 19.7 | 16.1 | 20.7 |
| Gloss, 60° | 33 | 42.5 | 47.2 | 55.6 | 58.7 | 52.6 | 59 |
| Rubber content wt % | 8.73 | 8.78 | 8.65 | 8.77 | 8.94 | 8.8 | 8.76 |
| Mineral Oil wt % | 3.12 | 3.2 | 3.04 | 3.28 | 3.14 | 3.34 | 3.12 |
| RPVF | 29.8 | 27.5 | 29.9 | 28.3 | 31.1 | 29.6 | |
| RPVF/% Pbu | 3.41 | 3.13 | 3.46 | 3.23 | 3.48 | 3.36 | |

Example 2

Tests were then performed using new configurations as depicted in FIGS. 6 and 7. FIG. 6 is depicted as having a first CSTR (V-1) followed by a first and second HPFIR (R-1 and R-2) followed by a second CSTR (V-2) followed by a third and fourth HPFIR (R-3 and R-4). Two grades, 825E PS and 7240 PS of commercial HIPS polystyrene grades available from Total Petrochemicals Europe, were selected for these tests.

TABLE 2-continued

| Trial No. | 8 | 9 | 10 | 11 |
|---|---|---|---|---|
| V-2 in Service? | Yes | Yes | Yes | Yes |
| Initiator | — | — | TBICM75 | TBICM75 |
| Initiator conc., ppm | | | 150 | 150 |
| NDM [ppm] | — | — | — | 150 |
| R-2 Agitation, | 50 | 100 | 116 | 200 |

TABLE 2-continued

| Trial No. | 8 | 9 | 10 | 11 |
|---|---|---|---|---|
| shear rate s$^{-1}$ | | | | |
| R-2 % Solids | 27.7 | 22.2 | 26.8 | 28.6 |
| Production Rate, lb/hr | 68 | 82 | 92 | 83 |
| Melt Flow Rate | 2.7 | 3 | 3.7 | 3.5 |
| Pellet RPS | 3.9 | 4.4 | 4.6 | 7.3 |
| Tensile Modulus, psi | 258900 | 278420 | 252460 | 259360 |
| Elongation @ Break, % | 42.4 | 37.4 | 48.5 | 50.3 |
| Flexural Modulus, psi | 311940 | 298980 | 285990 | 229400 |
| Swell Index | 11 | 10 | 12 | 14 |
| Gel Content | 23.72 | 23.02 | 24.74 | 21.54 |
| Grafting | 182.1 | 175 | 206.1 | 159.9 |
| Gel:Rubber | 2.88 | 2.75 | 3.06 | 2.60 |
| RPVF | 20.9 | 20.8 | 24.4 | 23.3 |
| RPVF/% Pbu | 2.53 | 2.49 | 3.02 | 2.81 |

Example 3

Figure 8:
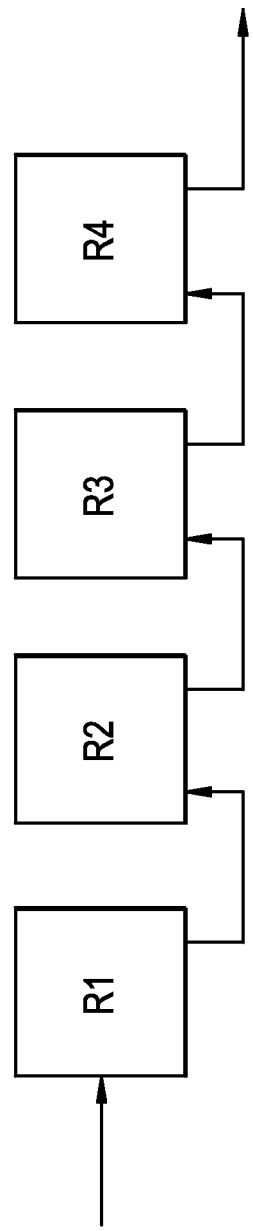
FIG. 8 is a schematic of a process used in the test of Example 3.

In Example 3 reactors V-1 and V-2 were removed, resulting in no CSTR in the process, as depicted in FIG. 8. This change produced an improvement in Gel:Rubber ratio. Eleven trials were conducted. Trial 12 used the new process configuration, but with V-1 and V-2 removed, as shown in FIG. 8. Trial 13 was the same as Trial 12, but initiated with Lupersol L233. Trial 14 was the same as Trial 12, but initiated with TBIC (TBIC was used from Trial 14 to Trial 22). Trial 15 was the same as Trial 14 but with very high R-1 and R-2 temperatures, 265° F. and 285° F., respectively, and with a fixed, low recycle flow rate at 14 lb/hr. Trial 16 was the same as Trial 15 but utilizing a level control scheme rather than a fixed recycle, resulting in a much higher recycle flow rate (32.5 lb/hr) than that of Trial 15. Trial 17 was the same as Trial 16 but with 10% less production rate to raise final conversion and to reduce recycle flow to 15 lb/hr. In Trial 18, the agitation was lowered to 50 s$^{-1}$ from 133 s$^{-1}$ at R-2, and 33 s$^{-1}$ from 67 s$^{-1}$ at R-3 and R-4. In Trial 19 there was another drop in agitation, with 25 s$^{-1}$ at R-2 and 17 s$^{-1}$ at R-3 and R-4. Trial 20 was the same as Trial 17 but used D55 rubber instead of D70. Trial 21 was the same as Trial 17 but used Taktene 380 rubber and a low agitation at R-3 (50 vs. 133 s$^{-1}$, to raise RPS). Trial 22 was the same as Trial 21 but with 100 s$^{-1}$ R-2 agitation.

Table 3 shows the results of Example 3. Table 3 also shows that the Example 3 processes achieved a higher Gel:Rubber ratio compared to the prior process in Table 1 and the Example 2 process in Table 2.

The first three trials, Trial 12 to Trial 14, confirm that initiators are beneficial for higher rubber efficiency.

TABLE 3

| Trial No. | 12 | 13 | 14 | 15 |
|---|---|---|---|---|
| Description | 7240 thermal | 7240 w/ L233 | 7240 w/ TBIC | 7240 w/ TBIC, low recycle |
| V-1 in Service? | No | No | No | No |
| V-2 in Service? | No | No | No | No |
| Initiator | | L233 | TBICM75 | TBICM75 |
| Initiator conc., ppm | | 100 | 150 | 100 |
| R-2 Agitation, shear rate s$^{-1}$ | 150 | 200 | 116 | 116 |
| Production Rate, lb/hr | 56 | 63 | 64 | 81 |
| Melt Flow Rate | 3.6 | 4.3 | 3.8 | 5.3 |
| Pellet RPS | 4.1 | 4 | 4 | 4.7 |
| Tensile Modulus, psi | 258000 | 251200 | 231430 | 211670 |
| Elongation @ Break, % | 49.3 | 58.4 | 51.3 | 46.4 |
| Flexural Modulus, psi | 288400 | 283100 | 252240 | 233000 |
| Swell Index | 12 | 12 | 12 | 12 |
| Gel Content | 24.87 | 24.88 | 27.51 | 28.99 |
| Grafting | 182 | 203.5 | 218.8 | 215.4 |
| Gel:Rubber | 2.8 | 3.03 | 3.19 | 3.15 |
| RPVF | 21.3 | 26.7 | 28 | 31.6 |
| RPVF/% Pbu | 2.41 | 3.26 | 3.24 | 3.44 |

| Trial No. | 16 | 17 | 18 | 19 |
|---|---|---|---|---|
| Description | 7240 w/ TBIC, level controlled | same as 16 but w/ minimal recycle flow | same as 17 but w/ slow agitation | same as 17 but w/ very slow agitation |
| V-1 in Service? | No | No | No | No |
| V-2 in Service? | No | No | No | No |
| Initiator | TBICM75 | TBICM75 | TBICM75 | TBICM75 |
| Initiator conc., ppm | 100 | 100 | 100 | 100 |
| R-2 Agitation, shear rate s$^{-1}$ | 150 | 133 | 50 | 25 |
| Production Rate, lb/hr | 73 | 66 | 63 | 68 |
| Melt Flow Rate | 4.7 | 5.6 | 5.2 | 8.3 |
| Pellet RPS | 3.9 | 3.8 | 5.6 | 7 |
| Tensile Modulus, psi | 249040 | 244850 | 219990 | 213820 |
| Elongation @ Break, % | 54.8 | 52.5 | 61.5 | 58.9 |
| Flexural Modulus, psi | 268300 | 272000 | 245000 | 235390 |
| Swell Index | 13 | 13 | 13 | 13 |
| Gel Content | 24.91 | 25.99 | 28.06 | 29.28 |
| Grafting | 195.2 | 208 | 226.6 | 247.7 |
| Gel:Rubber | 2.95 | 3.08 | 3.27 | 3.48 |
| RPVF | 26.9 | 27.2 | 31.1 | 31.1 |
| RPVF/% Pbu | 3.19 | 3.22 | 3.6 | 3.69 |

| Trial No. | 20 | 21 | 22 |
|---|---|---|---|
| Description | same as 17 but w/ D55 rubber | same as 17, 380 rubber R2 agit. 50 s$^{-1}$ | same as 21, 380 rubber R2 agit. 100 s$^{-1}$ |
| V-1 in Service? | No | No | No |
| V-2 in Service? | No | No | No |
| Initiator | TBICM75 | TBICM75 | TBICM75 |
| Initiator conc., ppm | 100 | 100 | 100 |
| R-2 Agitation, shear rate s$^{-1}$ | 133 | 50 | 100 |
| Production Rate, lb/hr | 67 | 62 | 64 |
| Melt Flow Rate | 5.9 | 5.2 | 6.4 |
| Pellet RPS | 3.5 | 4.2 | 3.2 |
| Tensile Modulus, psi | 244970 | 245170 | 246750 |
| Elongation @ Break, % | 54.7 | 53.5 | 59 |
| Flexural Modulus, psi | 267960 | 259740 | 266040 |
| Swell Index | 12 | 12 | 11 |
| Gel Content | 25.68 | 28.57 | 28.59 |
| Grafting | 205.3 | 238.1 | 233.6 |
| Gel:Rubber | 3.05 | 3.38 | 3.40 |
| RPVF | 30.4 | 29.5 | 26.3 |
| RPVF/% Pbu | 3.61 | 3.49 | 3.12 |

Table 4 compares the results of Trial 14 with Trial 10. Conditions used at Trial 14 are almost identical to those at Trial 10, but there is a difference in the process configuration. V-2 is removed for the entire Example 3 trials, including Trial 14. Trial 10 was the best performing product prior to the Example 3 trials. As shown in Table 4, Trial 14 exhibits better Gel:Rubber ratio value than Trial 10.

TABLE 4

Comparison of Trial 10 and Trial 14

| Trial No. | Trial 10 | Trial 14 |
|---|---|---|
| Description | 7240 w/ TBIC | 7240 w/ TBIC |
| V-1 in Service? | No | No |
| V-2 in Service? | Yes | No |
| Initiator | TBICM75 | TBICM75 |
| Initiator conc., ppm | 150 | 150 |
| R-2 Agitation shear rate s$^{-1}$ | 116 | 116 |
| R-2 % Solids | 26.8 | 28.8 |
| Production Rate, lb/hr | 92 | 64 |
| Melt Flow Rate | 3.7 | 3.8 |
| Pellet RPS | 4.6 | 4 |
| Tensile Modulus, psi | 252460 | 231430 |
| Elongation @ Break, % | 48.5 | 51.3 |
| Flexural Modulus, psi | 285990 | 252240 |
| Swell Index | 12 | 12 |
| Gel Content | 24.74 | 27.51 |
| Grafting | 206.1 | 218.8 |
| Gel:Rubber | 3.06 | 3.19 |
| RPVF | 24.4 | 28 |
| RPVF/% Pbu | 3.02 | 3.24 |

Example 4

High impact polystyrene was produced using a first vertical plug flow inversion reactor (VPFIR) process. Tests were conducted to determine ESCR values of the product of the VPFIR process. The results are in Table 5, below:

The test utilizing a first vertical plug flow inversion reactor resulted in poor ESCR values.

Example 5

High impact polystyrene was produced using a HPFIR process having four horizontal plug flow reactors, as shown in FIG. 8, in which the second horizontal reactor was the inversion reactor. The product leaving the fourth reactor was sent to two devolatizers and the removed volatile components from the devolatizers were recycled to the feed. Ten Trials, Trials 31-40, were performed in the process.

As shown in Table 6, Trials 37-40 showed the largest increase in ESCR. In Trial 37, PIB was added to the feed to determine its effect on ESCR. The addition of the PIB increased ESCR value to 21.4%. Trial 38 was performed with the same conditions as Trial 37, but with NDM removed. This reduced the RPS to 6.81 μm and the ESCR was the second highest at 25.6%. Trial 39 was performed with the same conditions as Trial 38, but with lower devolatizer temperatures, which resulted in the highest ESCR at 27.5%.

The ESCR performance of the product of this process was very high, having a value of approximately 26.5%. These results were accomplished with only 8.55% rubber, an RPS of about 6.8 μm, and a mineral oil to PIB content of 2:2. Key process conditions associated with this performance are low shear rate agitation, high solid content, and high temperature during inversion. RPS distributions were significantly narrower than those typically obtained under CSTR inversion.

The addition of 2% PIB doubled ESCR performance from 10.9 to 21.4%. This very high ESCR performance is more than sufficient for hot lid food applications.

ESCR performance increases from about 1.5 to 12% when RPS increases from about 4 to 7 μm. However, the use of PIB more than doubles ESCR performance for RPS greater than 7 μm.

TABLE 5

| Trial No. | 23 | 24 | 25 | 26 | 27 | 28 | 29 | 30 |
|---|---|---|---|---|---|---|---|---|
| Product/Description | 8260 | 8260 | hi PFIR solids | V-2 in | 26 + TBIC | D55 rubber | Hi PFIR Agit. | 29, no TBIC |
| V-2 in Service? | No | No | No | Yes | Yes | Yes | Yes | Yes |
| Initiator Type | | | | | TBICM75 | TBICM75 | TBICM75 | |
| Initiator [ppm] | | | | | 50 | 75 | 75 | |
| NDM [ppm] | 0 | 200 | 100 | 100 | 100 | 220 | 220 | 160 |
| Rubber Type | D70 | D70 | D70 | D70 | D70 | D55 | D55 | D55 |
| Rubber (wt %) | 8.2 | 8.2 | 8.2 | 8.2 | 8.2 | 8.2 | 8.2 | 8.2 |
| Mineral Oil, % | 2 | 2 | 2 | 2 | 2 | 2 | 2 | 2 |
| PFIR Agitation shear rate s$^{-1}$ | 108 | 141 | 140 | 140 | 141 | 141 | 170 | 141 |
| PFIR Solids, % | 28 | 24.3 | 32.8 | 33.4 | 31.3 | 34 | 34 | 35.7 |
| Recycle Flow Rate | 19 | 25 | 21.7 | 26.8 | 21 | 14 | 16 | 17.8 |
| Production Rate, lb/hr | 76 | 71 | 73 | 74 | 78 | 76 | 76 | 80 |
| Pellet RPS, μ (Volume) | 5.85 | 8.77 | 9.08 | 8.08 | 8.17 | 8.86 | 8.12 | 9.07 |
| Melt Flow, dg/10 min | 3.3 | 4.3 | 3.6 | 3.2 | 2.9 | 3.7 | 3.5 | 3.2 |
| Tensile Modulus | 224640 | 243370 | 257850 | 255100 | 251260 | 276970 | 278140 | 277200 |
| Flexural Modulus | 292850 | 267340 | 284890 | 284810 | 287240 | 310130 | 306890 | 313040 |
| Swell Index | 13 | 15 | 14 | 10 | 11 | 13 | 13 | 12 |
| Gel: Rubber | 2.79 | 2.58 | 2.65 | 2.97 | 2.80 | 2.48 | 2.54 | 2.39 |
| Rubber content | 8.33 | 8.44 | 8.32 | 7.99 | 8.3 | 8.43 | 8.21 | 9.03 |
| RPVF | 33.6 | 37.1 | 35.1 | 30.6 | 33.1 | 31.4 | 30.6 | 31.2 |
| RPVF/% Pbu | 4.03 | 4.40 | 4.22 | 3.83 | 3.99 | 3.72 | 3.73 | 3.46 |
| ESCR, % Toughness Retained | 1 | 4.6 | 2.5 | 1.3 | 4.2 | 2.6 | 2.3 | 2.5 |

TABLE 6

| Trial Number | 31 | 32 | 33 | 34 | 35 | 36 | 37 | 38 | 39 | 40 |
|---|---|---|---|---|---|---|---|---|---|---|
| Flow Configuration | HPFIR | HPFIR | HPFIR | HPFIR | HPFIR | HPFIR | HPFIR | HPFIR | HPFIR | HPFIR |
| Product/Comments | Baseline | NDM low conv | | | | | | | | |
| Feed Compositions | | | | | | | | | | |
| Initiator Type/[ppm] | TBIC/100 | TBIC/100 | L531/100 | L531/100 | L531/100 | L531/100 | L531/100 | L531/100 | L531/100 | L531/100 |
| NDM [ppm] | 0 | 100 | 0 | 0 | 50 | 50 | 50 | 0 | 0 | 0 |
| Rubber Type | T710 | T710 | T710 | T710 | T710 | T710 | T710 | T710 | T710 | T710 |
| Rubber (wt %) | 8.2 | 8.2 | 8.2 | 8.2 | 8.2 | 8.2 | 8.2 | 8.2 | 8.2 | 8.2 |
| Mineral Oil, % | 2 | 2 | 2 | 2 | 2 | 2 | 2 | 2 | 2 | 1 |
| PIB, % | 0 | 0 | 0 | 0 | 0 | 0 | 2 | 2 | 2 | 2.5 |
| Feed Conditions | | | | | | | | | | |
| R-1 Agitation s$^{-1}$ | 150 | 150 | 150 | 150 | 150 | 150 | 150 | 150 | 150 | 150 |
| R-2 Agitation s$^{-1}$ | 100 | 50 | 50 | 50 | 50 | 50 | 50 | 50 | 50 | 50 |
| R-3 Agitation s$^{-1}$ | 33 | 33 | 33 | 33 | 33 | 33 | 33 | 33 | 33 | 33 |
| R-4 Agitation s$^{-1}$ | 33 | 33 | 33 | 33 | 33 | 33 | 33 | 33 | 33 | 33 |
| Recycle Flow Rate, lb/hr | 29 | 20.3 | 18 | 17.5 | 21.1 | 21.0 | 22.2 | 22.5 | 26.3 | 21.4 |
| Production Rate, lb/hr | 60 | 68 | 68 | 68 | 68 | 67 | 67 | 67 | 66 | 66 |
| Reactor Solids | | | | | | | | | | |
| R-1 Solids, % | 16 | 16.2 | 17 | 17.5 | 16.8 | 15.5 | 16.4 | 16.7 | | |
| R-2 Solids, % | 30 | 33.8 | 33 | 35 | 33.9 | 34 | 33.7 | 34.8 | | |
| R-3 Solids, % | 52.4 | 55 | 57 | 61 | 54.6 | 47 | 56 | 54.3 | | |
| R-4 Solids, % | 77 | 86 | 87 | 86 | 82.4 | 85 | 81.9 | 84.8 | | |
| RPS Data Along Process | | | | | | | | | | |
| R-1 RPS, μm | 30.07 | 50 | 48.6 | 46.95 | 30.2 | 80 | 59.92 | 41.11 | | |
| R-2 RPS, μm | 2.56 | 8.45 | 4.75 | 6.06 | 6.29 | 8.48 | 8.68 | 6.13 | | |
| R-3 RPS, μm | 2.73 | 9.64 | 5.3 | 6.95 | 7.34 | 9.77 | 10.32 | 7.18 | | |
| R-4 RPS, μm | 3.05 | 10.11 | 5.44 | 7.41 | 7.94 | 10.37 | 10.97 | 7.78 | | |
| DV1 RPS, μm | | | 5.24 | 6.92 | 7.25 | 9.8 | 8.49 | 7.23 | | |
| Product Characterization | | | | | | | | | | |
| Melt Flow, dg/10 min | 4.45 | 4.2 | 3.22 | 3.4 | 3.76 | 4.05 | 4.79 | 4.22 | | |
| Rubber content, % | 8.52 | 8.58 | 8.32 | 8.57 | 8.53 | 8.41 | 8.6 | 8.51 | | |
| Pellet RPS, mm | 2.73 | 8.82 | 5.12 | 6.55 | 7.07 | 8.82 | 8.95 | 6.81 | | |
| Swell Index | 10 | 14 | 10 | 10 | 11 | 11 | 12 | 11 | | |
| Gel Content | 27.9 | 25.5 | 29.8 | 31.1 | 31 | 30.8 | 29.3 | 29.4 | | |
| Mn | 68375 | 69151 | 67555 | 66118 | 65753 | 66589 | 67634 | 67162 | | |
| Mw | 180153 | 178272 | 180612 | | 177539 | 172753 | 170991 | 173722 | | |
| Polydispersity | 2.6 | 2.6 | 2.7 | 2.7 | 2.7 | 2.6 | 2.5 | 2.6 | | |
| RPVF | 28.2 | 35.8 | 36.6 | 40 | 40.7 | 40.9 | 39.4 | 39.9 | | |
| RPVF/Rubber | 3.31 | 4.17 | 4.40 | 4.67 | 4.77 | 4.86 | 4.58 | 4.69 | | |
| Izod Break Type - Notched | 1.7 | 2.06 | 1.62 | 1.63 | 1.63 | 1.76 | 2.03 | 2.04 | | |
| Tensile Modulus | 255193 | 233134 | 221436 | 215765 | 211718 | 210802 | 205107 | 206588 | | |
| Tensile Strength @ Yield | 3107 | 2511 | 2604 | 2480 | 2348 | 2329 | 2284 | 2367 | | |
| Tensile Strength @ Break | 3274 | 3190 | 3567 | 3342 | 3348 | 3371 | 3128 | 3174 | | |
| Elongation @ Break | 46.5 | 57.4 | 65.2 | 55.7 | 62.3 | 63 | 71.7 | 70.5 | | |
| Flexural Modulus | 275550 | 259081 | 243284 | 236660 | 235965 | 231541 | 229205 | 228699 | | |
| Flexural Strength | 6400 | 5668 | 5874 | 5684 | 5413 | 5386 | 5070 | 5134 | | |
| ESCR Toughness Untreated | | 815 | 1119 | 1090 | 1219 | 1036 | 1203 | 1125 | | |
| ESCR Toughness Treated | | 175 | 45 | 65 | 139 | 113 | 257 | 288 | | |
| ESCR, % Toughness Retained | | 21.5 | 4 | 6 | 11.4 | 10.9 | 21.4 | 25.6 | | |

TABLE 6-continued

| Reactor Solids | | |
|---|---|---|
| R-1 Solids, % | 16 | 16.7 |
| R-2 Solids, % | 35.5 | 34.4 |
| R-3 Solids, % | 55.5 | 55.5 |
| R-4 Solids, % | 85 | 86 |
| RPS Data Along Process | | |
| R-1 RPS, μm | 31.54 | 26.69 |
| R-2 RPS, μm | 5.97 | 6.61 |
| R-3 RPS, μm | 6.84 | 7.51 |
| R-4 RPS, μm | 7.45 | 8.13 |
| DV1 RPS, μm | 7.06 | 7.48 |
| Product Characterization | | |
| Melt Flow, dg/10 min | 5.55 | 3.92 |
| Rubber content, % | 8.54 | 8.56 |
| Pellet RPS, mm | 6.87 | 7.04 |
| Swell Index | 13 | 11 |
| Gel Content | 27.17 | 29.89 |
| Mn | 67925 | 65946 |
| Mw | 172861 | 172092 |
| Polydispersity | 2.5 | 2.6 |
| RPVF | 40.3 | 40.3 |
| RPVF/Rubber | 4.72 | 4.71 |
| Izod Break Type - Notched | 2.18 | 1.89 |
| Tensile Modulus | 222803 | 206092 |
| Tensile Strength @ Yield | 2424 | 2605 |
| Tensile Strength @ Break | 2943 | 3260 |
| Elongation @ Break | 74.9 | 64.2 |
| Flexural Modulus | 245981 | 227091 |
| Flexural Strength | 5123 | 5412 |
| ESCR Toughness Untreated | 1234 | 1227 |
| ESCR Toughness Treated | 339 | 247 |
| ESCR, % Toughness Retained | 27.5 | 20.1 |

Example 6

High impact polystyrene was produced using a HPFIR process having a small CSTR as the pre-inversion reactor, followed by four horizontal plug flow reactors such as shown in FIG. 4. The small work volume of the CSTR, 410, allows the reactor to reach a high reactor temperature while keeping the reactor contents from being inverted. A high temperature at 410 narrows the temperature difference between the inversion reactor, 420 and the CSTR 410, while resulting in a lower temperature used in the inversion reactor, 420. Trials 41-47 were used in this process scheme. The process conditions and results of the trials are shown in Table 7.

The use of 410 as a PIR moves the inversion to 420, allowing all four PFRs (420, 430, 440, 450) to run at high conversion rates. The results of these Trials, shown in Table 7, indicate that: the use of the small CSTR 410 as the pre-inversion reactor results in an 18% increase in production rate. Pellet RPS is a key factor in deciding whether the product will have desirable morphology; rubber particles having size larger than about 7.5 μm are more susceptible to poor morphology. There is a positive relationship between RPS and ESCR value measured as % toughness retained. There is a compromise between RPS and particle integrity; to obtain high toughness retained values, it is desirable to have large RPS (about 7 μm) but rubber particles larger than about 7.5 μm are more susceptible to poor morphology; and an increase in PIB loading results in a decrease in flexural strength.

PIB is proven to be beneficial in improving ESCR. The increase of PIB concentration depressed flexural strength of the ESCR products. There appears to be an inverse relationship between percent toughness retained and flexural strength.

TABLE 7

| Trial No. | 41 | 42 | 43 | 44 |
|---|---|---|---|---|
| Product/Description/Comments | V-1/HPFIR | L531/233 Cat. | L531/233 Cat. | L531/233 Cat. |
| Feed | | | | |
| Initiator Type | L531 | L531/L233 | L531/L233 | L531/L233 |
| Initiator [ppm] | 100 | 80/40 | 80/40 | 80/40 |
| NDM [ppm] | | | | |
| Rubber D70 (wt %) | 8.2 | 8.2 | 8.2 | 8.2 |
| Mineral Oil, % | 1 | 1 | 1 | 1 |
| PIB, % | 2.5 | 2.5 | 2.5 | 2.5 |
| V-1 Level, % | 53 | 53 | 53 | 45 |
| R-1 Agitation s$^{-1}$ | 50 | 50 | 33 | 33 |
| R-2 Agitation s$^{-1}$ | 50 | 50 | 33 | 33 |
| R-3 Agitation s$^{-1}$ | 33 | 33 | 33 | 33 |
| R-4 Agitation s$^{-1}$ | 33 | 33 | 33 | 33 |
| Production Rate/RPS/M Flow | | | | |
| Production Rate, lb/hr | 77 | 79 | 77 | 78 |
| Pellet RPS, μm | 6.07 | 5.86 | 7.12 | 7.81 |
| Pellet RPS Span | 1.169 | 1.059 | 1.111 | 1.654 |
| Melt Flow, dg/10 min | 5.1 | 5.7 | 5.4 | 6.4 |
| Product Properties | | | | |
| Dart | 100.2 | 98.9 | 90.4 | 79.3 |
| Izod Impact-Notched | 2.3 | 1.9 | 1.9 | 1.9 |
| Tensile Modulus | 220260 | 214080 | 203450 | 198310 |

TABLE 7-continued

| | | | | |
|---|---|---|---|---|
| Tensile Strength @ Yield | 2670 | 2580 | 2420 | 2410 |
| Tensile Strength @ Break | 2970 | 2920 | 2940 | 2910 |
| Elongation @ Break | 64.6 | 60.8 | 58.5 | 57.1 |
| Flexural Modulus | 241010 | 238850 | 227430 | 222700 |
| Flexural Strength | 5390 | 5270 | 5100 | 5120 |
| Swell Index | 14 | 13 | 13 | 14 |
| Gel:Rubber | 3.07 | 3.29 | 3.32 | 3.19 |
| Rubber content | 8.79 | 8.68 | 8.83 | 8.79 |
| RPVF | 36.7 | 37.4 | 40.3 | 40.8 |
| RPVF/% Pbu | 4.18 | 4.31 | 4.56 | 4.64 |
| ESCR Toughness Untreated | 1059 | 862 | 953 | 990 |
| ESCR Toughness Treated | 90 | 113 | 259 | 267 |
| ESCR, % Toughness Retained | 8.5 | 13.1 | 27.2 | 27 |

| Trial No. | 45 | 46 | 47 |
|---|---|---|---|
| Product/Description/Comments | Ref 41, w/NDM | 1% oil & PIB, NDM | Ref 45, but no NDM |
| Feed | | | |
| Initiator Type | L531/L233 | L531/L233 | L531/L233 |
| Initiator [ppm] | 80/40 | 80/40 | 80/40 |
| NDM [ppm] | 40 | 40 | |
| Rubber D70 (wt %) | 8.2 | 8.2 | 8.2 |
| Mineral Oil, % | 1 | 1 | 1 |
| PIB, % | 2.5 | 1 | 1 |
| V-1 Level, % | 53 | 53 | 53 |
| R-1 Agitation s$^{-1}$ | 50 | 50 | 50 |
| R-2 Agitation s$^{-1}$ | 50 | 50 | 50 |
| R-3 Agitation s$^{-1}$ | 33 | 33 | 33 |
| R-4 Agitation s$^{-1}$ | 33 | 33 | 33 |
| Production Rate/RPS/Melt Flow | | | |
| Production Rate, lb/hr | 79 | 79 | 78 |
| Pellet RPS, μm (Volume) | 7.48 | 8.6 | 5.97 |
| Pellet RPS Span | 1.127 | 1.368 | 1.086 |
| Melt Flow, dg/10 min | 6.9 | 6.5 | 6.3 |
| Product Properties | | | |
| Tensile Modulus | 206340 | 208570 | 215350 |
| Tensile Strength @ Yield | 2420 | 2430 | 2570 |
| Tensile Strength @ Break | 2870 | 3150 | 3120 |
| Elongation @ Break | 61.2 | 55.5 | 55.6 |
| Flexural Modulus | 229880 | 231620 | 239500 |
| Flexural Strength | 5120 | 5390 | 5650 |
| Swell Index | 14 | 13 | 12 |
| Gel:Rubber | 3.17 | 3.45 | 3.63 |
| Rubber content | 8.67 | 8.74 | 8.53 |
| RPVF | 37 | 37.7 | 36.1 |
| RPVF/% Pbu | 4.27 | 4.31 | 4.23 |
| ESCR Toughness Untreated | 943 | 830 | 875 |
| ESCR Toughness Treated | 230 | 80 | 33 |
| ESCR, % Toughness Retained | 24.4 | 9.6 | 3.8 |

Example 7

High impact polystyrene was produced using a HPFIR process having four horizontal plug flow reactors in which the second horizontal reactor was the inversion reactor. The product leaving the fourth reactor was sent to two devolatizers and the removed volatile components from the devolatizers were recycled to the feed. Sample 38 from Example 5 achieved excellent rubber utilization and ESCR performance. Sample 38 was made with an elevated reactor temperature, 300° F. (149° C.), at the inversion reactor. The high temperature yielded a very high solids content at the reactor (34.8%), and consequently a relatively high pellet average RPS, 6.81 μm. In this Example, Sample 38 was reproduced at a lower temperature. Five Trials were run at the new lower temperature. In Table 8, the conditions and results of the tests are compared with Trial 38 of Example 5.

The reproduction of Sample 38 from Example 5 at a lower temperature achieved slightly lower, yet satisfactory rubber utilization. A mixture of low and high temperature catalysts at a 1:1 ratio did not yield better or worse results than a single low temperature catalyst system.

Figure 10:
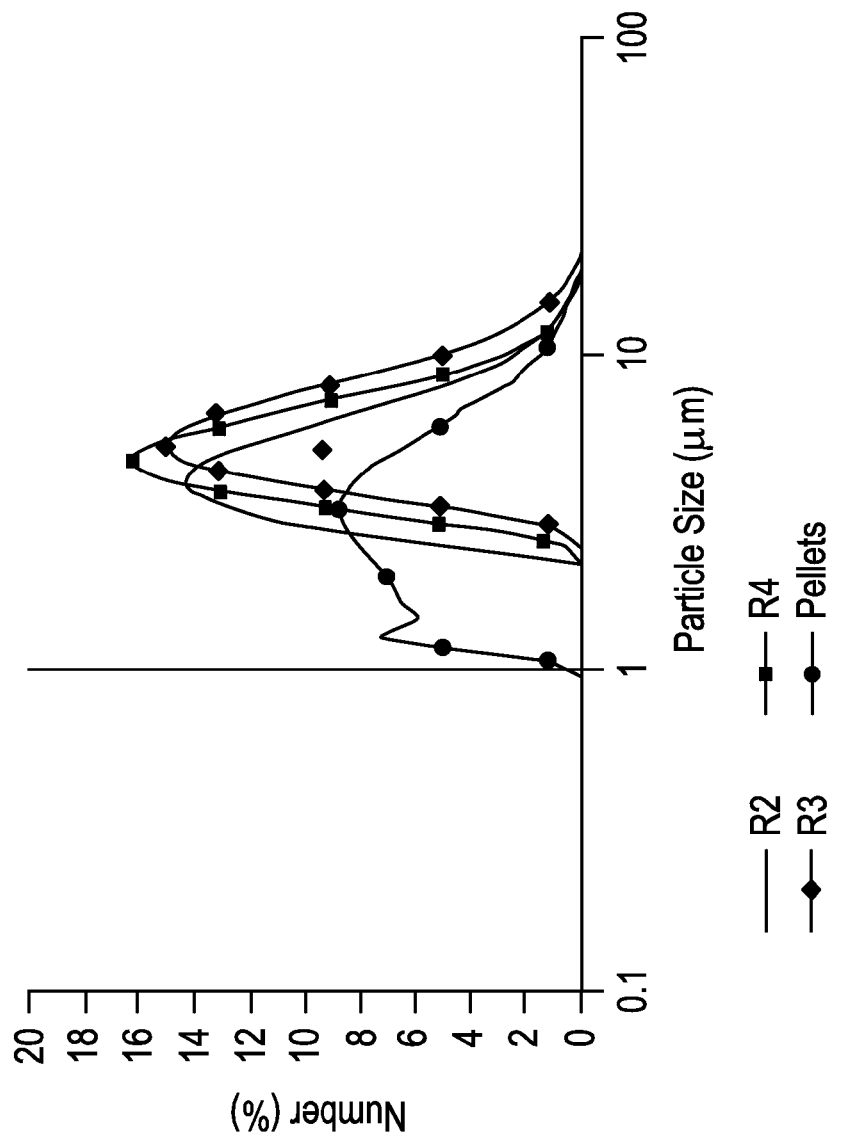
FIG. 10 is a graph of average particle size distribution of reactor contents in a multi-reactor process and the resultant product pellets.

In sample 52, an elevated inversion reactor temperature, 290° F. (143° C.), was utilized and the feed was identical to the feed in 38, except that no PIB was used in sample 52. Sample 52 achieved narrow particle size distributions for the reactor contents and a rubber particle size of 7.76; however, the particle size distribution was broad in the product pellets, indicating a degradation of the morphology in the final production stages. The results of sample 52 are indicated in the graph of FIG. 10.

Two formulations, Lacqrene 8260, available from Total Petrochemicals Europe, and Lacqrene 8260 with 2% PIB, were used in this Example and in Example 5. The percent toughness retained values of the two formulations are plotted against RPS in FIG. 9 for Trials 33-39, 48, 50, and 51. Two relationships are evident; one for 8260 and the other for PIB modified 8260. As can be observed from FIG. 9, the PIB modified 8260, indicated by the diamond graph points, exhibit a much higher percent toughness retained than the standard 8260, as indicated by square graph points.

Figure 9:
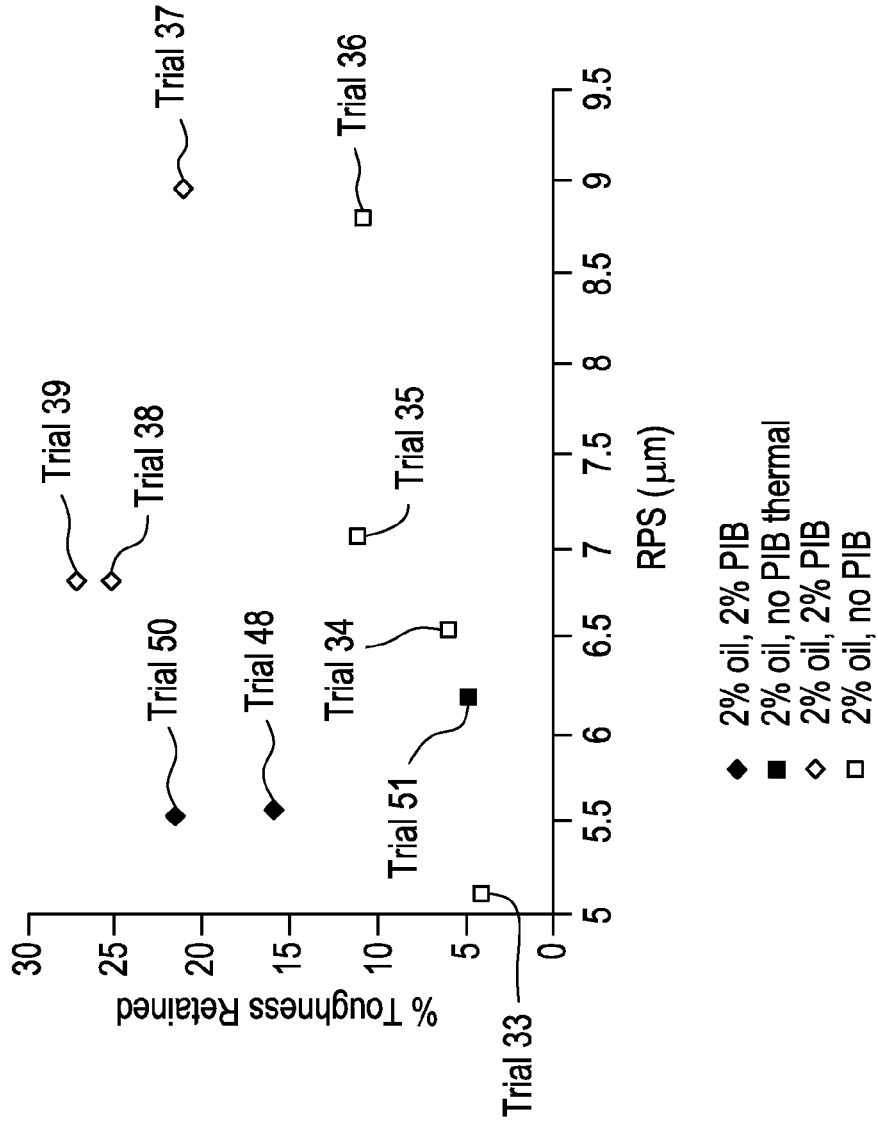
FIG. 9 is a graph of percent toughness retained as a function of RPS.

The effect of RPS on ESCR can be observed from FIG. 9. For both the 8260 and PIB modified 8260 the percent toughness retained increases as the RPS increases up to a RPS of about 7 μm. For Trials having a RPS of greater than 8 μm a decrease in the percent toughness retained is seen, and therefore a decrease in ESCR values also occurs.

TABLE 8

| Trial Number | 38 | 48 | 49 |
|---|---|---|---|
| Product/Description/Comments | | | 531/233 mixed |
| Initiator Type | L531 | L531 | L531/L233 |
| Initiator [ppm] | 100 | 100 | 50/50 |
| NDM [ppm] | | | |
| D70 Rubber (wt %) | 8.2 | 8.2 | 8.2 |
| Mineral Oil, % | 2 | 2 | 2 |
| PIB, % | 2 | 2 | 2 |
| R-2 Agitation s$^{-1}$ | 50 | 50 | 50 |
| Production Rate, lb/hr | 67 | 65 | 58 |
| Melt Flow Rate | 4.2 | 5.8 | 4 |
| Rubber Particle Size | 6.81 | 5.57 | 4.87 |
| Tensile Modulus | 206590 | 211850 | 229730 |
| Tensile Strength @ Yield | 2370 | 2450 | 2620 |
| Tensile Strength @ Break | 3170 | 2880 | 3020 |
| Elongation @ Break | 70.5 | 58.1 | 65.6 |
| Flexural Modulus | 228700 | 233770 | 2470040 |
| Flexural Strength | 5130 | 5020 | 5380 |
| Swell Index | 11 | 12 | 12 |
| Gel:Rubber | 3.41 | 3.24 | 3.10 |
| Rubber content | 8.51 | 8.53 | 8.51 |
| RPVF | 39.9 | 35.5 | 33.8 |
| RPVF/% Pbu | 4.69 | 4.16 | 3.97 |
| ESCR Toughness Untreated | 1125 | 954 | |
| ESCR Toughness Treated | 288 | 154 | |
| ESCR, % Toughness Retained | 25.6 | 16.1 | |

| Trial Number | 50 | 51 | 52 |
|---|---|---|---|
| Product/Description/Comments | Ref 48 | | |
| Initiator Type | L531/L233 | | |

TABLE 8-continued

| | | | |
|---|---|---|---|
| Initiator [ppm] | 50/50 | | |
| NDM [ppm] | | | 30 |
| D70 Rubber (wt %) | 8.2 | 8.2 | 8.2 |
| Mineral Oil, % | 2 | 2 | 2 |
| PIB, % | 2 | | |
| R-2 Agitation s$^{-1}$ | 50 | 50 | 50 |
| Production Rate, lb/hr | 66 | 61 | 61 |
| Melt Flow Rate | 3.6 | 3.7 | 3.6 |
| Rubber Particle Size | 5.54 | 6.2 | 7.76 |
| Tensile Modulus | 211040 | 221570 | 211820 |
| Tensile Strength @ Yield | 2430 | 2510 | 2380 |
| Tensile Strength @ Break | 3020 | 3100 | 3130 |
| Elongation @ Break | 64.1 | 44.1 | 44.7 |
| Flexural Modulus | 224000 | 240550 | 230200 |
| Flexural Strength | 5070 | 5390 | 5340 |
| Swell Index | 11 | 10 | 10 |
| Gel:Rubber | 3.26 | 3.47 | 3.61 |
| Rubber content | 9.02 | 8.51 | 8.59 |
| RPVF | 36.4 | 36.7 | 40.2 |
| RPVF/% Pbu | 4.04 | 4.31 | 4.68 |
| ESCR Toughness Untreated | 1128 | 1016 | |
| ESCR Toughness Treated | 246 | 50 | |
| ESCR, % Toughness Retained | 21.8 | 4.9 | |

Example 8

High impact polystyrene was produced using a HPFIR process and a HPFIR process having a small CSTR as the pre-inversion reactor, followed by four horizontal plug flow reactors, such as shown in FIG. 4. This example shows that each HPFIR process produces resins having superior rubber utilization with comparable ESCR and ductility, compared to the prior process as shown in FIG. 5, even at a lower rubber loading. The results are shown in Table 9.

TABLE 9

| Trial Number | 53 | 54 |
|---|---|---|
| Sample | HPFIR | V-1 + HPFIR |
| NDM [ppm] | | |
| Rubber Type | D70 | D70 |
| Rubber (wt %) | 8.2 | 8.2 |
| Mineral Oil, % | 2 | 2 |
| PIB, % | 2 | 2 |
| Pellet RPS, μm (Volume) | 5.53 | 6.19 |
| Pellet RPS Span | 1.106 | 1.08 |
| Melt Flow, dg/10 min | 3.7 | 3.8 |
| Rubber content, measured | 8.78 | 8.88 |
| Mineral Oil NIR | 2.26 | 2.31 |
| Production Rate, lbs/hr | 65 | 70 |
| Dart | 117.6 | 104.7 |
| Tensile Modulus | 212230 | 221150 |
| Tensile Strength @ Yield | 2540 | 2430 |
| Tensile Strength @ Break | 3050 | 2920 |
| Elongation @ Break | 60.4 | 67.5 |
| Flexural Modulus | 235340 | 237720 |
| Flexural Strength | 5270 | 5220 |
| Swell Index | 10 | 11 |
| Gel Content | 31.93 | 31.9 |
| Gel:Rubber | 3.64 | 3.59 |
| RPVF | 38.5 | 40.6 |
| RPVF/% Pbu | 4.38 | 4.57 |
| Mn | 69150 | 76430 |

TABLE 9-continued

| Trial Number | 53 | 54 |
|---|---|---|
| Mw | 184490 | 182430 |
| Polydispersity | 2.7 | 2.4 |
| ESCR Toughness Untreated | 1192 | 1165 |
| ESCR Toughness Treated | 142 | 328 |
| ESCR, % Toughness Retained | 11.9 | 28.2 |

Example 9

Figure 11:
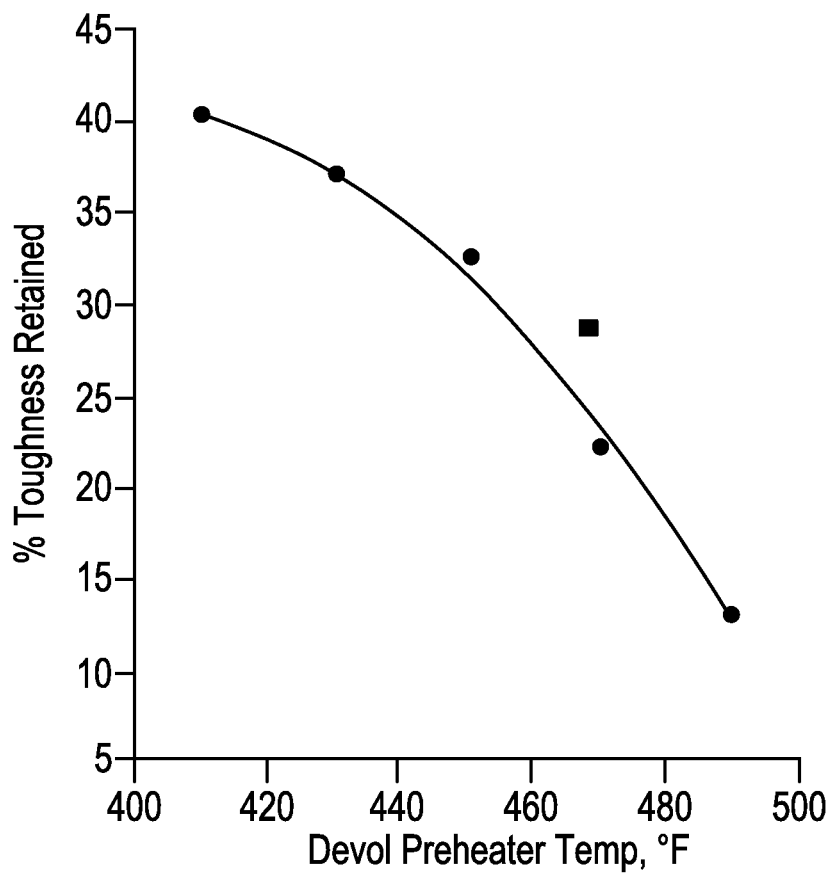
FIG. 11 is a graph of ESCR values (% toughness retained) vs devolatizer preheater temperature.

High impact polystyrene was produced using a HPFIR process and a HPFIR process having a small CSTR as the pre-inversion reactor, followed by four horizontal plug flow reactors, such as shown in FIG. 4, along with a devolatizer preheater prior to the devolatizer. Trials were run at various devolatizer preheater temperatures to observe its effect on product characteristics. Following the devolatizer preheater was a devolatizer having a jacket oil temperature of 480° F. (249° C.). This example shows that changing the devolatizer conditions can produce resins having improved ESCR properties as shown in FIG. 11. The trials having a devolatizer preheater temperature of 450° F. (232° C.) or less produced product having ESCR in excess of 30% toughness retained. The results are shown in Table 10.

TABLE 10

| Trial Number | 55 | 56 | 57 | 58 | 59 |
|---|---|---|---|---|---|
| Sample Description | FIG. 4 1 CSTR - 4HPF | FIG. 4 1 CSTR - 4HPF | FIG. 4 1 CSTR - 4HPF | FIG. 4 1 CSTR - 4HPF | FIG. 4 1 CSTR - 4HPF |
| Rubber Type (Conc.) | D70 (8.2 wt %) | D70 (8.2 wt %) | D70 (8.2 wt %) | D70 (8.2 wt %) | D70 (8.2 wt %) |
| Initiator type | L531/L233 | L531/L233 | L531/L233 | L531/L233 | L531/L233 |
| Initiator ppm | 80/40 | 80/40 | 80/40 | 80/40 | 80/40 |
| NDM, ppm | 0 | 0 | 0 | 0 | 0 |
| PIB, % | 0 | 0 | 0 | 0 | 0 |
| Inv Reactor Agitation shear rate s$^{-1}$ | 60 | 60 | 60 | 60 | 60 |
| DV Preheater Temp ° F. | 490 | 470 | 450 | 430 | 410 |
| DV jacket temp ° F. | 480 | 475 | 480 | 480 | 480 |
| Production Rate, lb/hr | 76 | 78 | 78 | 77 | 76 |
| Melt Flow Rate | 3.1 | 3.3 | 3.5 | 3.8 | 3.9 |
| Rubber Particle Size | 5.61 | 6.21 | 6.18 | 6.25 | 5.98 |
| Tensile Modulus | 197310 | 194520 | 197750 | 198860 | 201890 |
| Elongation @ Break | 62.4 | 58.5 | 63.4 | 62.9 | 56.2 |
| Flexural Modulus | 219980 | 218690 | 219100 | 219650 | 221750 |
| Swell Index | 10 | 11 | 11 | 11 | 10 |
| Gel Content Grafting Gel:Rubber | 4.23 | 3.62 | 3.73 | 3.55 | 4.07 |
| Rubber content wt % | 8.65 | 8.83 | 8.81 | 8.74 | 8.74 |
| Mineral Oil wt % | | | | | |
| RPVF | 42.2 | 42.7 | 41.1 | 43.4 | 42.6 |
| RPVF/% Pbu | 4.88 | 4.84 | 4.67 | 4.97 | 4.87 |
| ESCR, % Toughness Retained | 13.2 | 22.4 | 32.6 | 37 | 40.3 |

A comparison of the various configurations and conditions are shown in Table 11. Trial 4 is used as the baseline in which two CSTR reactors are followed by four HPF reactors, as illustrated in FIG. 5. The phase inversion occurs in the second CSTR reactor. Trial 10 used a configuration as in FIG. 7 where two HPF reactors, having phase inversion in the second reactor, is followed by one CSTR and two HPF reactors, resulting in increased grafting and gel:rubber ratio. Trials 17 and 18 were performed with four HPF reactors as shown in FIG. 8 resulting in increased grafting, gel:rubber ratio, RPVF and RPVF/% Pbu values.

Trial 24 utilized a vertical inversion reactor, and resulted in a poor ESCR value of 4.6% toughness retained. Trial 36 was performed with four HPF reactors as shown in FIG. 8 resulting in increased ESCR value of 10.9% toughness retained. Trials 37 and 39 were performed with four HPF reactors as shown in FIG. 8 and the addition of PIB resulted in increased ESCR values of over 21% toughness retained. Trials 44 and 54 were performed with one small CSTR (non-inversion) followed by four HPF reactors as shown in FIG. 4 and the addition of PIB, resulting in further increased ESCR values of over 26% toughness retained. Trials 58 and 59 were performed with one small CSTR (non-inversion) followed by four HPF reactors as shown in FIG. 4 and the addition of a devolatizer having a reduced temperature, resulting in increased ESCR values of over 35% toughness retained.

TABLE 11

| Trial Number | 4 | 10 | 17 | 18 |
|---|---|---|---|---|
| Sample Description | FIG. 5 Baseline 2 CSTR-4HPF | FIG. 7 2HPF-1 CSTR-2HPF | FIG. 8 4HPF | FIG. 8 4HPF |
| Rubber Type (Conc.) | D55 (9%) | | | |
| Initiator type/ppm | TBIC/360 | TBIC/150 | TBIC/100 | TBIC/100 |
| NDM, ppm | 72 | 0.0 | | |
| PIB, % | | | | |
| Inv Reactor Agitation shear rate s$^{-1}$ | | 116 | 133 | 50 |
| Production Rate, lb/hr | 91 | 92 | 66 | 63 |
| Melt Flow Rate | 4.43 | 3.7 | 5.6 | 5.2 |
| Rubber Particle Size | 3.62 | 4.6 | 3.8 | 5.6 |
| Tensile Modulus | 266600 | 252460 | 244850 | 219990 |
| Elongation @ Break | 57.3 | 48.5 | 52.5 | 61.5 |
| Flexural Modulus | 288700 | 285990 | 272000 | 245000 |
| Swell Index | 13 | 12 | 13 | 13 |
| Gel Content | 23.45 | 24.74 | 25.99 | 28.06 |
| Grafting | 167.4 | 206.1 | 208 | 226.6 |
| Gel:Rubber | 2.67 | 3.06 | 3.08 | 3.27 |
| Rubber content wt % | 8.77 | | | |
| Mineral Oil wt % | 3.28 | | | |
| RPVF | 28.3 | 24.4 | 27.2 | 31.1 |
| RPVF/% Pbu | 3.23 | 3.02 | 3.22 | 3.6 |
| ESCR, % Toughness Retained | | | | |

| Trial Number | 24 | 36 | 37 | 39 |
|---|---|---|---|---|
| Sample Description | Vert inv reactor | FIG. 8 4HPF | FIG. 8 4HPF | FIG. 8 4HPF |
| Rubber Type (Conc.) | D70 | T710 (8.2%) | T710 (8.2%) | T710 (8.2%) |
| Initiator type/ppm | — | L531/100 | L531/100 | L531/100 |
| NDM, ppm | 200 | 50 | 50 | 0.0 |
| PIB, % | — | 0 | 2.0 | 2.0 |
| Inv Reactor Agitation shear rate s$^{-1}$ | 141 | 50 | 50 | 50 |
| Production Rate, lb/hr | 71 | 67 | 67 | 66 |
| Melt Flow Rate | 4.3 | 4.05 | 4.79 | 5.55 |
| Rubber Particle Size | 8.77 | 8.82 | 8.95 | 6.87 |
| Tensile Modulus | 243370 | 210802 | 205107 | 222803 |
| Elongation @ Break | | 63.0 | 71.7 | 74.9 |
| Flexural Modulus | 267340 | 231541 | 229205 | 245981 |
| Swell Index | 15 | 11 | 12 | 13 |
| Gel Content | | 30.84 | 29.3 | 27.17 |
| Grafting | | | | |
| Gel:Rubber | 2.58 | | | |
| Rubber content wt % | 8.44 | 8.41 | 8.6 | 8.54 |
| Mineral Oil wt % | | 2.23 | 2.22 | 2.06 |
| RPVF | 37.1 | 40.9 | 39.4 | 40.3 |
| RPVF/% Pbu | 4.4 | 4.86 | 4.58 | 4.72 |
| ESCR, % Toughness Retained | 4.6 | 10.9 | 21.4 | 27.5 |

| Trial Number | 44 | 54 | 58 | 59 |
|---|---|---|---|---|
| Sample Description | FIG. 4 1 CSTR - 4HPF | FIG. 4 1 CSTR - 4HPF | FIG. 4 1 CSTR - 4HPF | FIG. 4 1 CSTR - 4HPF |
| Rubber Type (Conc.) | D70 (8.2%) | D70 (8.2%) | D70 (8.2%) | D70 (8.2%) |
| Initiator type/ | L531/80 | | L531/80 | L531/80 |

TABLE 11-continued

| | | | | |
|---|---|---|---|---|
| ppm | L233/40 | | L233/40 | L233/40 |
| NDM, ppm | 0.0 | 0.0 | | |
| PIB, % | 2.5 | 2.0 | | |
| Inv Reactor Agitation shear rate s$^{-1}$ | 33 | | 60 | 60 |
| DV Preheater Temp | | | 430 | 410 |
| Production Rate, lb/hr | 78 | 70 | 77 | 76 |
| Melt Flow Rate | 6.4 | 3.8 | 3.8 | 3.9 |
| Rubber Particle Size | 7.81 | 6.19 | 6.25 | 5.98 |
| Tensile Modulus | 198310 | 221150 | 198860 | 201890 |
| Elongation @ Break | 57.1 | 67.5 | 62.9 | 56.2 |
| Flexural Modulus | 222700 | 237720 | 219650 | 221750 |
| Swell Index | 14 | 11 | 11 | 10 |
| Gel Content | 28.0 | 31.9 | 31.0 | 35.6 |
| Grafting Gel:Rubber | 3.19 | 3.59 | 3.55 | 4.07 |
| Rubber content wt % | 8.79 | 8.89 | 8.74 | 8.74 |
| Mineral Oil wt % | 1.0 | 2.31 | | |
| RPVF | 40.8 | 40.6 | 43.4 | 42.6 |
| RPVF/% Pbu | 4.64 | 4.57 | 4.97 | 4.87 |
| ESCR, % Toughness Retained | 27 | 28.2 | 37 | 40.3 |

Improved RPVF and rubber utilization can be achieved using a process having three or more horizontal plug flow reactors in which the inversion reactor is one of the horizontal plug flow reactors. The ability to isolate the inversion reactor and operate it at a controlled agitation rate can improve the control of rubber particle size and desirable morphology. An advantage of smaller and more reactors is the ability to control the agitation rate at inversion. The use of multiple HPF reactors enables a more controlled process in which the amount of pre-inversion, inversion, and post-inversion reactions can be controlled to a greater extent, enabling greater control on the rubber particle size, rubber utilization, and resulting morphology and physical properties. ESCR values can be further improved with the addition of PIB with the process described herein. ESCR values can be further improved with the use of a devolatizer preheater at reduced temperature with the process described herein. In an embodiment the ESCR values can be improved with the use of a devolatizer preheater at temperatures of 480° F. or less with the process described herein. Embodiments can include the use of a devolatizer preheater at temperatures of 460° F. (238° C.) or less, optionally 440° F. (227° C.) or less, optionally 430° F. (221° C.) or less, optionally 420° F. (215° C.) or less.

Determination of % Gel and Swell Index

The swelling index of high impact polystyrene is determined as the ratio of weight of the swollen gel (extracted with toluene) to the weight of the dried gel. The gel content is determined as dried weight of the gel (after toluene extraction of the polystyrene sample) divided by the total weight of the sample. It is usually reported as a percentage.

Determination of % Grafting and % Rubber

Free polystyrene (ungrafted, uncrosslinked) is separated from the "insolubles" (i.e., rubber, grafted and crosslinked polystyrene) by methylethylketone (MEK) extraction. The resulting residue is dissolved in dichloromethane and the % rubber is determined.

The % Graft: Rubber Ratio is defined as the weight of grafted polystyrene divided by the weight of rubber, multiplied by 100.

The percentage of rubber in HIPS is determined by reacting the double bonds in the rubber with excess iodine monchloride (ICl). The amount of rubber that undergoes the reaction is determined by a back titration of the excess ICl with standardized thiosulfate and comparison with a blank titration of the ICl.

Experimental Determination of ESCR

Description: Tensile bars are exposed to margarine (no-salt) for varying times in an oven at 65° C. (149±2° F.). ESCR is determined by measuring percent elongation. ESCR using toughness retained is determined by the comparison of exposed and non-exposed tensile bars. The ESCR scale using toughness retained as used herein is: 0-9 poor; 10-19 good; 20-30 very good; and >30 excellent.

Sample Preparation: Samples are compression molded according to ASTM procedures. Ten tensile bars are molded preferably without silicone mold release. Oil, grease or other chemicals should not come in contact with the bars to be tested. Surfaces to be exposed to margarine should not be touched. The sample bars should be allowed to sit for an hour before testing.

Testing: Tensile bars are positioned in a sample holder. The bars are then wiped with a thin coat of margarine ±1" from their midpoint (i.e., spread over approximately 2" of the sample). The samples are exposed in an oven at 65° C. (149° F.). Margarine is wiped off the samples as soon as they are removed from the oven. The samples are allowed to sit for one to two hours before determining percent elongation per ASTM procedures. Maximum strain is calculated according to the following formula (ASTM D-790): Strain=$(6Dd/L^2)$ where D=max. deflection of the center beam, L=support span, and d=depth or thickness of sample Experimental Determination of RPVF The final polymer composite is submitted to dynamic mechanical analysis (DMA). From the DMA results the rubber phase volume fraction RPVF can be calculated utilizing techniques discussed in the publication of Stephane Jouenne et al. in Macromolecules 2008, volume 41, pages 9823-9830.

Test Standards and Notes:
1) NDM refers to n-dodecyl mercaptan
2) Izod Impact tested by ASTM D256
3) Melt Flow tested by ASTM D1238
4) The Rubber Particle Size in microns measured from a Malvern 2000 analyzer with methyl ethyl ketone as solvent.
5) Tensile Properties tested by ASTM D638

6) Flexural Properties tested by ASTM D790
7) Swell Index, Gel Content and Grafting are described herein and in U.S. Pat. No. 4,777,210 which is incorporated by reference in its entirety.
8) TBIC used to refer to the organic peroxide Luperox TBIC M75 available from Arkema Inc. of Philadelphia, Pa.
9) ESCR values are determined according to U.S. Pat. No. 4,777,210, which is incorporated by reference in its entirety.
10) All testing performed by ASTM standards unless specified otherwise.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A process for producing high impact polystyrene in serially arranged reactors, comprising:
    feeding at least one vinyl aromatic monomer, an elastomer, and a free radical initiator to a first linear plug flow reactor to form a reaction mixture;
    polymerizing the reaction mixture in the first linear flow reactor to a point below the point at which phase inversion occurs to produce a first polymerization mixture;
    feeding the first polymerization mixture from the first linear flow reactor to a second linear flow reactor;
    polymerizing the first polymerization mixture in the second linear plug flow reactor to at least a phase inversion point of the mixture to produce a second polymerization mixture, wherein the second linear flow reactor is a horizontally oriented plug flow reactor that is equipped with an agitator; and
    feeding the second polymerization mixture from the second linear flow reactor to at least two serially arranged post-inversion reactors for post-inversion polymerization of the second polymerization mixture, wherein each post-inversion reactor is a linear plug flow reactor;
    wherein a product stream leaving the post-inversion reactors has an ESCR value at an oven temperature of 65° C. of at least 10% toughness retained with less than 10 wt % rubber content.

2. The process of claim 1, wherein the serially arranged reactors do not include any continuous stirred tank reactors.

3. The process of claim 1, wherein each linear flow reactor is horizontally oriented.

4. The process of claim 1, further comprising feeding polyisobutylene homopolymer to the reaction mixture in the first linear flow reactor in an amount of from 0.5 to 3.0 wt %.

5. The process of claim 3, wherein the second linear flow reactor is operated at temperatures of greater than 230° F. (110° C.).

6. The process of claim 1, wherein the product stream has an ESCR value at an oven temperature of 65° C. of at least 20% toughness retained.

7. The process of claim 6, wherein the product stream has an ESCR value at an oven temperature of 65° C. of at least 25% toughness retained.

8. The process of claim 1, wherein the product stream has an average RPS greater than 5 μm.

9. The process of claim 1, wherein the product stream has an average RPS between 5 μm and 8 μm.

10. The process of claim 1, wherein agitators of the linear flow reactors are operated to give a shear rate of less than 175 $s^{-1}$.

11. A process for producing high impact polystyrene in serially arranged reactors, comprising:
    feeding at least one vinyl aromatic monomer, an elastomer, and a free radical initiator to a mixing tank to form a reaction mixture;
    feeding the reaction mixture from the mixing tank to a first linear flow reactor;
    polymerizing the reaction mixture in the first linear flow reactor to a point below the point at which phase inversion occurs to produce a first polymerization mixture;
    feeding the first polymerization mixture from the first linear flow reactor to a second linear flow reactor;
    polymerizing the first polymerization mixture in the second linear flow reactor to at least a phase inversion point of the mixture to produce a second polymerization mixture, wherein the second linear flow reactor is a horizontally oriented plug flow reactor that is equipped with an agitator; and
    feeding the second polymerization mixture from the second linear flow reactor to at least two serially arranged post-inversion reactors for post-inversion polymerization of the second polymerization mixture, wherein each post-inversion reactor is a linear plug flow reactor;
    wherein an interior volume of the mixing tank has a ratio to the volume of the linear flow reactors of from 1:4 to 8:1;
    wherein a product stream leaving the post-inversion reactors has an ESCR value at an oven temperature of 65° C. of at least 10% toughness retained with less than 10 wt % rubber content.

12. The process of claim 11, wherein the serially arranged reactors do not include a continuous stirred tank reactor.

13. The process of claim 11, wherein each linear flow reactor is horizontally oriented.

14. The process of claim 11, further comprising feeding polyisobutylene homopolymer to the reaction mixture in the mixing tank in an amount of from 0.5 to 3.0 wt %.

15. The process of claim 11, wherein the second linear flow reactor is operated at temperatures of greater than 230° F. (110° C.).

16. The process of claim 11, wherein the reaction mixture in the mixing tank is maintained at temperatures of less than 230° F. (110° C.).

17. The process of claim 11, wherein the product stream that leaves the post-inversion reactors is sent to a devolatizer preheater operated at temperatures of less than 470° F. (243° C.).

18. The process of claim 11, wherein the product stream has an ESCR value at an oven temperature of 65° C. of at least 15% toughness retained.

19. The process of claim 18, wherein the product stream has an ESCR value at an oven temperature of 65° C. of at least 25% toughness retained.

20. The process of claim 18, wherein the product stream has an average RPS greater than 5 μm.

21. The process of claim 18, wherein the product stream has an average RPS between 5 μm and 8 μm.

22. The process of claim 11, wherein agitators of the linear flow reactors are operated to give a shear rate of less than 175 $s^{-1}$.

23. A process for producing high impact polystyrene in serially arranged reactors, comprising:
feeding at least one vinyl aromatic monomer, an elastomer, and a free radical initiator to a CSTR to form a reaction mixture;
polymerizing the reaction mixture in the CSTR to a point below the point at which phase inversion occurs to produce a first polymerization mixture;
feeding the first polymerization mixture from the CSTR to a first linear flow reactor;
polymerizing the first polymerization mixture in the first linear flow reactor to at least a phase inversion point of the mixture to produce a second polymerization mixture wherein the first linear flow reactor is a horizontally oriented plug flow reactor that is equipped with an agitator; and
feeding the second polymerization mixture from the first linear flow reactor to at least two post-inversion reactors for post-inversion polymerization of the second polymerization mixture, wherein each post-inversion reactor is a linear plug flow reactor;
wherein a product stream leaving the post-inversion reactors has an ESCR value at an oven temperature of 65° C. of at least 10% toughness retained with less than 10 wt % rubber content.

24. The process of claim 23, wherein the CSTR is the only CSTR in the serially arranged reactors.

25. The process of claim 23, wherein each linear flow reactor is horizontally oriented.

26. The process of claim 23, further comprising feeding polyisobutylene homopolymer to the reaction mixture in the CSTR in an amount of from 0.5 to 3.0 wt %.

27. The process of claim 23, wherein the first linear flow reactor is operated at temperatures of greater than 250° F. (121° C.).

28. The process of claim 23, wherein the reaction mixture in the CSTR is heated to temperatures of from 220° F. to 260° F.

29. The process of claim 23, wherein the product stream has an ESCR value at an oven temperature of 65° C. of at least 15% toughness retained.

30. The process of claim 29, wherein the product stream has an ESCR value at an oven temperature of 65° C. of at least 25% toughness retained.

31. The process of claim 29, wherein the product stream has an average RPS greater than 5 μm.

32. The process of claim 29, wherein the product stream has an average RPS between 5 μm and 8 μm.

33. The process of claim 23, wherein agitators of the linear flow reactors are operated to give a shear rate of less than 175 $s^{-1}$.

34. The process of claim 11, wherein the reaction mixture in the mixing tank is maintained at temperatures of from 150° F. to 225° F.

35. The process of claim 11, wherein the mixing tank comprises agitators.

36. The process of claim 1, further comprising feeding polyisobutylene homopolymer and mineral oil to the reaction mixture in the first linear flow reactor, wherein the polyisobutylene homopolymer and the mineral oil are each present in an amount of from 0.5 to 3.0 wt %.

37. The process of claim 1, wherein the post-inversion reactors comprises at least three serially arranged linear plug flow reactors.

38. The process of claim 11, wherein the only heat supplied to the mixing tank is from the feed of the at least one vinyl aromatic monomer, the elastomer, and the free radical initiator.

39. The process of claim 11, wherein the interior volume of the mixing tank has a ratio to the volume of the linear flow reactors of from 1:1 to 2:1 or from 2:1 to 6:1.

* * * * *